US009065922B2

(12) United States Patent
Khan

(10) Patent No.: US 9,065,922 B2
(45) Date of Patent: Jun. 23, 2015

(54) SYSTEM AND METHOD FOR PROVIDING LOW BATTERY NOTIFICATIONS ON MOBILE DEVICES

(75) Inventor: Tabarak Khan, Hoffman Estates, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 393 days.

(21) Appl. No.: 13/172,466

(22) Filed: Jun. 29, 2011

(65) Prior Publication Data
US 2013/0002441 A1   Jan. 3, 2013

(51) Int. Cl.
| | | |
|---|---|---|
| G08B 21/00 | (2006.01) | |
| H04M 1/725 | (2006.01) | |
| H04W 52/02 | (2009.01) | |
| H04L 29/08 | (2006.01) | |

(52) U.S. Cl.
CPC ...... *H04M 1/72519* (2013.01); *H04M 1/72552* (2013.01); *H04W 52/0212* (2013.01); *H04W 52/0261* (2013.01); *H04L 67/306* (2013.01)

(58) Field of Classification Search
CPC .................. B60R 2021/01554; B60R 21/015; B60R 2021/01516; G01R 31/3648; G08B 29/181; H02J 7/0047; H04Q 7/22; H04Q 7/00; H04B 1/38
USPC .................. 340/636.1; 455/574, 418, 404.1; 725/39; 702/63; 320/162
See application file for complete search history.

(56) References Cited

U.S. PATENT DOCUMENTS

| | | | |
|---|---|---|---|
| 6,072,784 A * | 6/2000 | Agrawal et al. ............... | 370/311 |
| 6,408,172 B1 * | 6/2002 | Alperovich et al. ........ | 455/404.1 |
| 6,459,896 B1 | 10/2002 | Liebenow | |
| 6,704,583 B1 * | 3/2004 | Yoshioka ...................... | 455/574 |
| 7,251,505 B2 * | 7/2007 | Shin et al. ..................... | 455/567 |
| 7,583,984 B2 | 9/2009 | Sun et al. | |
| 8,301,168 B2 * | 10/2012 | Zubas et al. ............... | 455/456.3 |
| 8,504,118 B2 * | 8/2013 | Kharia et al. ................. | 455/574 |
| 8,521,229 B2 * | 8/2013 | Naruse .......................... | 455/566 |
| 8,572,262 B2 * | 10/2013 | Ensing et al. ................. | 709/228 |

(Continued)

FOREIGN PATENT DOCUMENTS

| | | | |
|---|---|---|---|
| EP | 1768345 | | 3/2007 |
| WO | 03037007 | | 5/2003 |
| WO | WO-03037007 | * | 5/2003 |

OTHER PUBLICATIONS

Android Market description—Battery Status Bar; Extract from http://www.androidzoom.com/android applications/tools/battery-status-bar gegb.html. accessed online at least as early as Aug. 16, 2010.

(Continued)

*Primary Examiner* — Benjamin Lee
*Assistant Examiner* — Quang D Pham
(74) *Attorney, Agent, or Firm* — Jon Gibbons; Fleit Gibbons Gutman Bongini & Bianco P.L.

(57) ABSTRACT

A system and method are provided for providing notifications related to the battery level of a mobile device. Upon detecting a low battery state, a low battery update may be sent to a presence server to enable the low battery update to be provided to one or more contacts associated with the mobile device. The one or more contacts may then update their UI to reflect a change in presence status and may provided alerts upon detecting that the mobile device has been recharged.

17 Claims, 20 Drawing Sheets

(56) References Cited

U.S. PATENT DOCUMENTS

| | | | |
|---|---|---|---|
| 8,751,592 B2* | 6/2014 | Garcia et al. | 709/206 |
| 2001/0009864 A1* | 7/2001 | Seo | 455/574 |
| 2002/0128051 A1* | 9/2002 | Liebenow | 455/574 |
| 2003/0078979 A1 | 4/2003 | Sagi | |
| 2005/0085277 A1* | 4/2005 | Chen et al. | 455/572 |
| 2005/0148331 A1* | 7/2005 | Sharon et al. | 455/435.1 |
| 2005/0156748 A1 | 7/2005 | Lee | |
| 2006/0075268 A1* | 4/2006 | Kim et al. | 713/300 |
| 2006/0121951 A1* | 6/2006 | Perdomo et al. | 455/572 |
| 2007/0067443 A1* | 3/2007 | Seligmann et al. | 709/224 |
| 2008/0311961 A1* | 12/2008 | Cotevino et al. | 455/574 |
| 2009/0156268 A1* | 6/2009 | Kim et al. | 455/573 |
| 2009/0325613 A1 | 12/2009 | Kuulusa et al. | |
| 2010/0003950 A1* | 1/2010 | Ray et al. | 455/404.1 |
| 2010/0151918 A1* | 6/2010 | Annambhotla et al. | 455/573 |
| 2010/0184419 A1* | 7/2010 | Othmer | 455/418 |
| 2010/0216521 A1* | 8/2010 | Wu et al. | 455/572 |
| 2011/0039605 A1* | 2/2011 | Choi et al. | 455/573 |
| 2011/0128153 A1* | 6/2011 | Sims et al. | 340/636.1 |
| 2012/0077454 A1* | 3/2012 | Paddon et al. | 455/404.1 |
| 2012/0077486 A1* | 3/2012 | Park et al. | 455/422.1 |
| 2012/0217971 A1* | 8/2012 | Deluca | 324/426 |
| 2012/0249323 A1* | 10/2012 | McRae | 340/539.11 |
| 2012/0306655 A1* | 12/2012 | Tan et al. | 340/636.1 |
| 2013/0054706 A1* | 2/2013 | Graham et al. | 709/206 |
| 2013/0086406 A1* | 4/2013 | Matton et al. | 713/324 |

OTHER PUBLICATIONS

Windows 7 Battery Bar-Extract from http://www.intowindows.com/display-battery-status-in-windows-7-taskbar-with-windows-7-battery-bar.; accessed online at least as early as Aug. 16, 2010.

Extended European Search Report dated Oct. 27, 2011. In corresponding application No. 11171947.2.

* cited by examiner

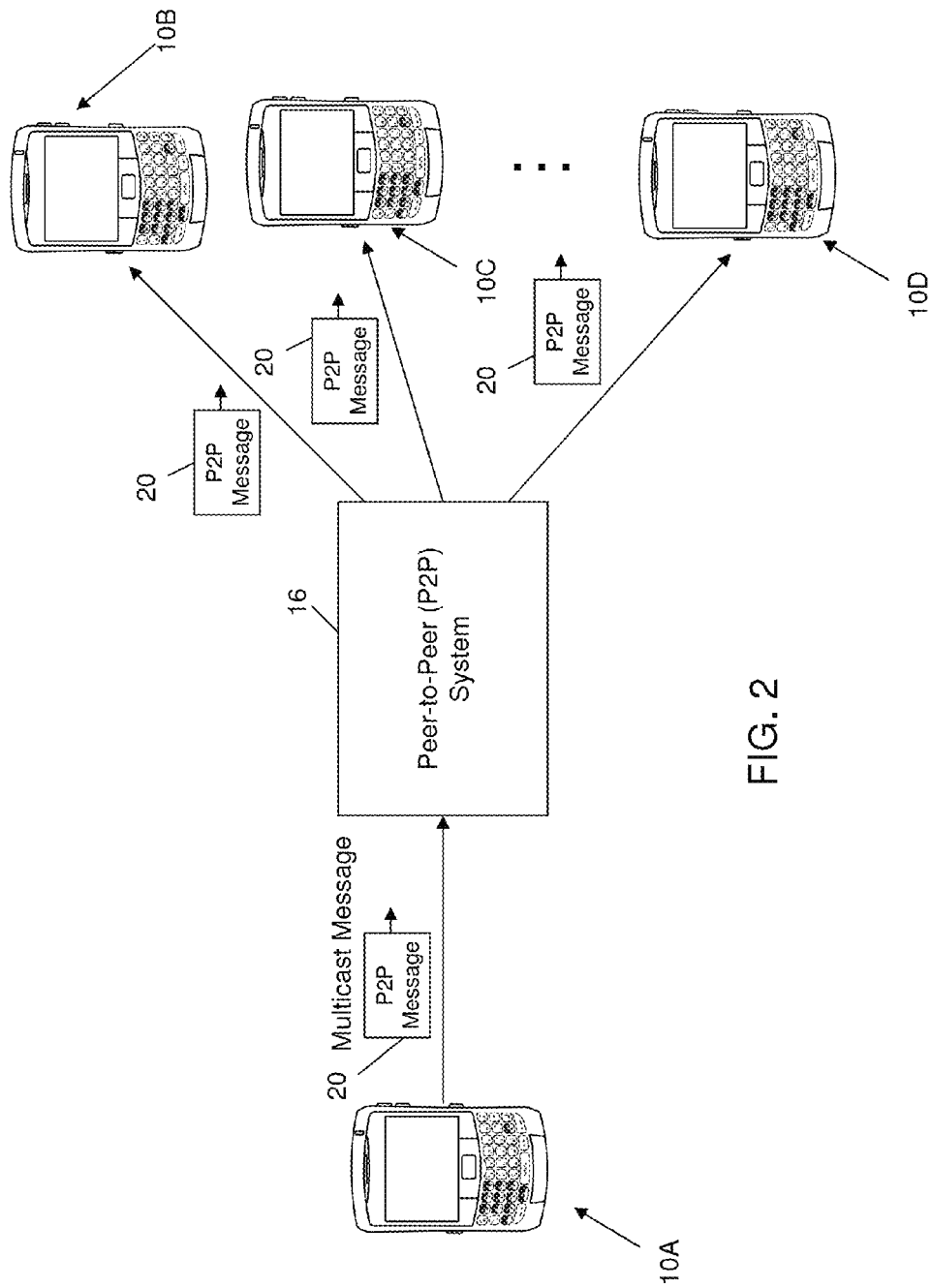

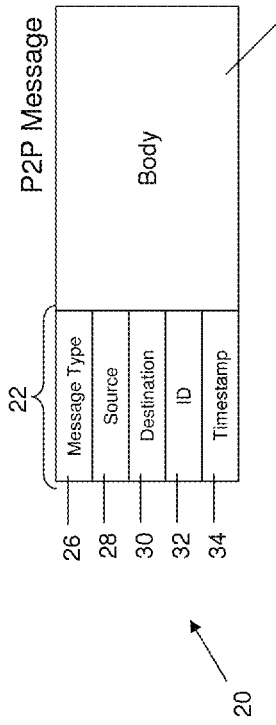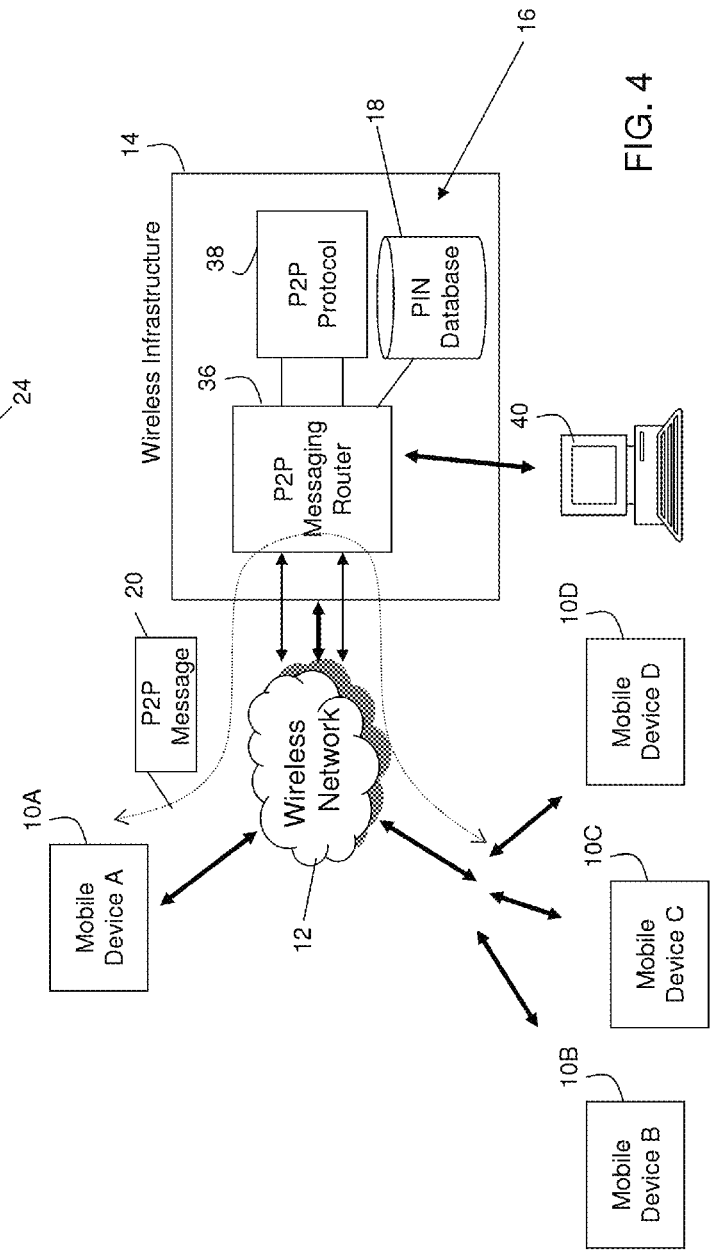

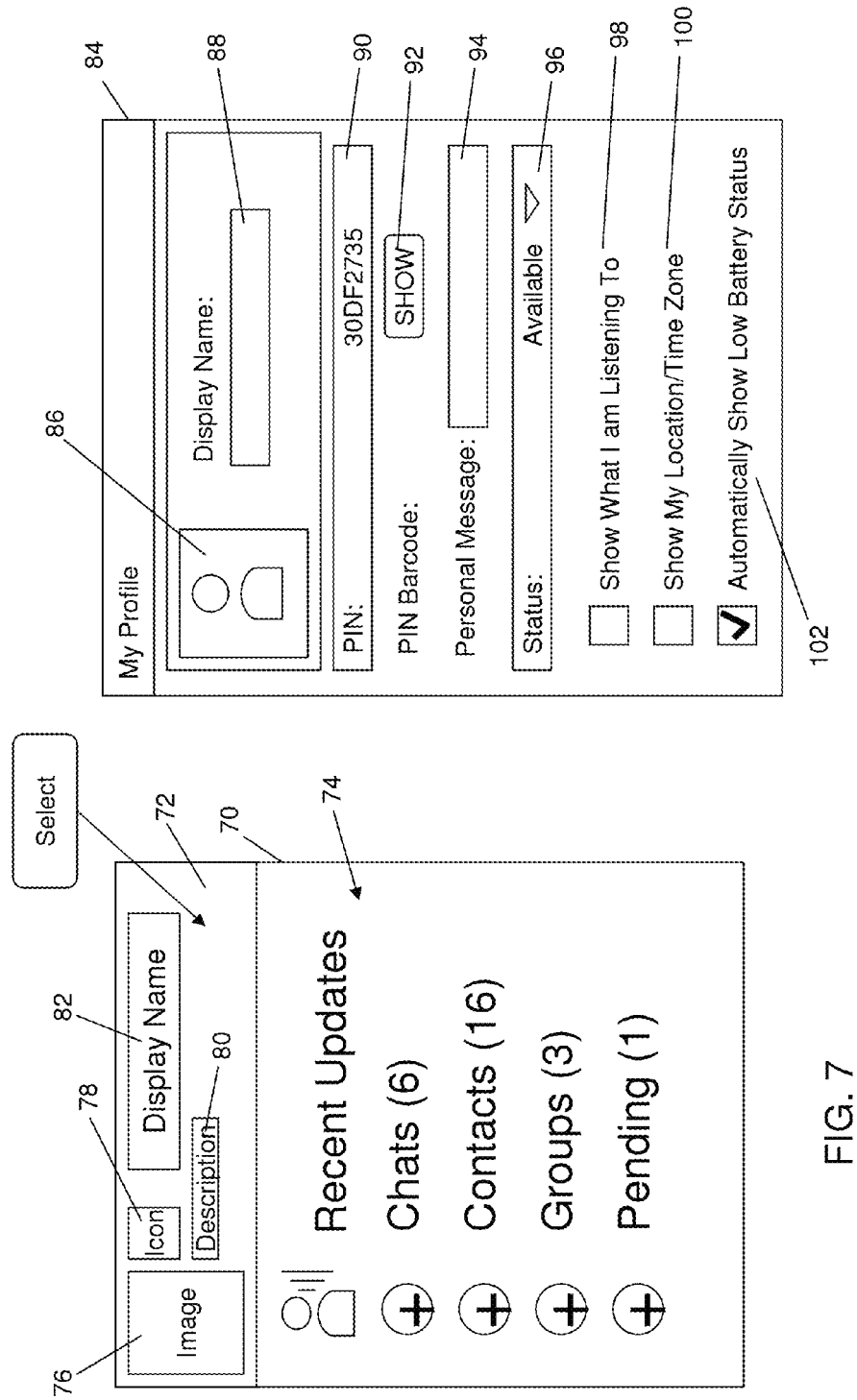

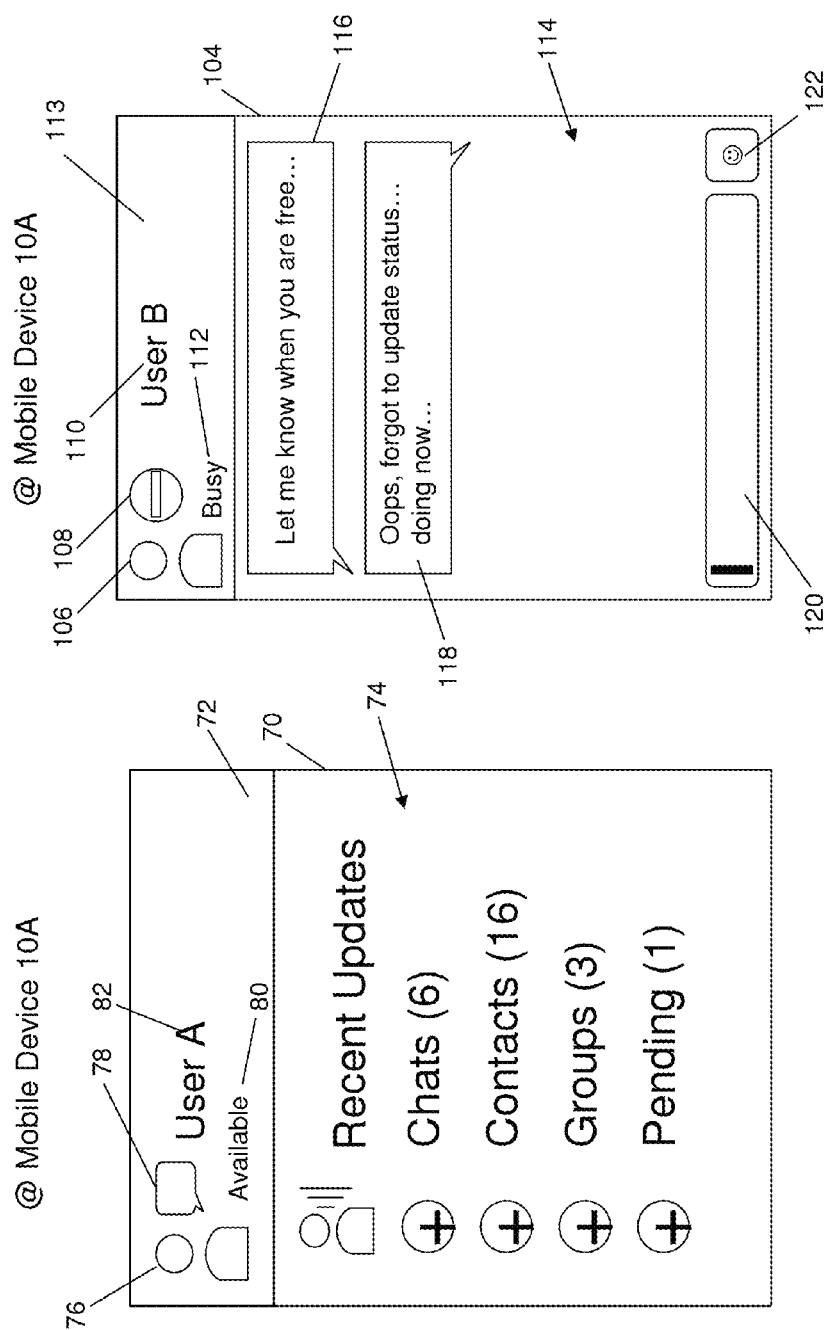

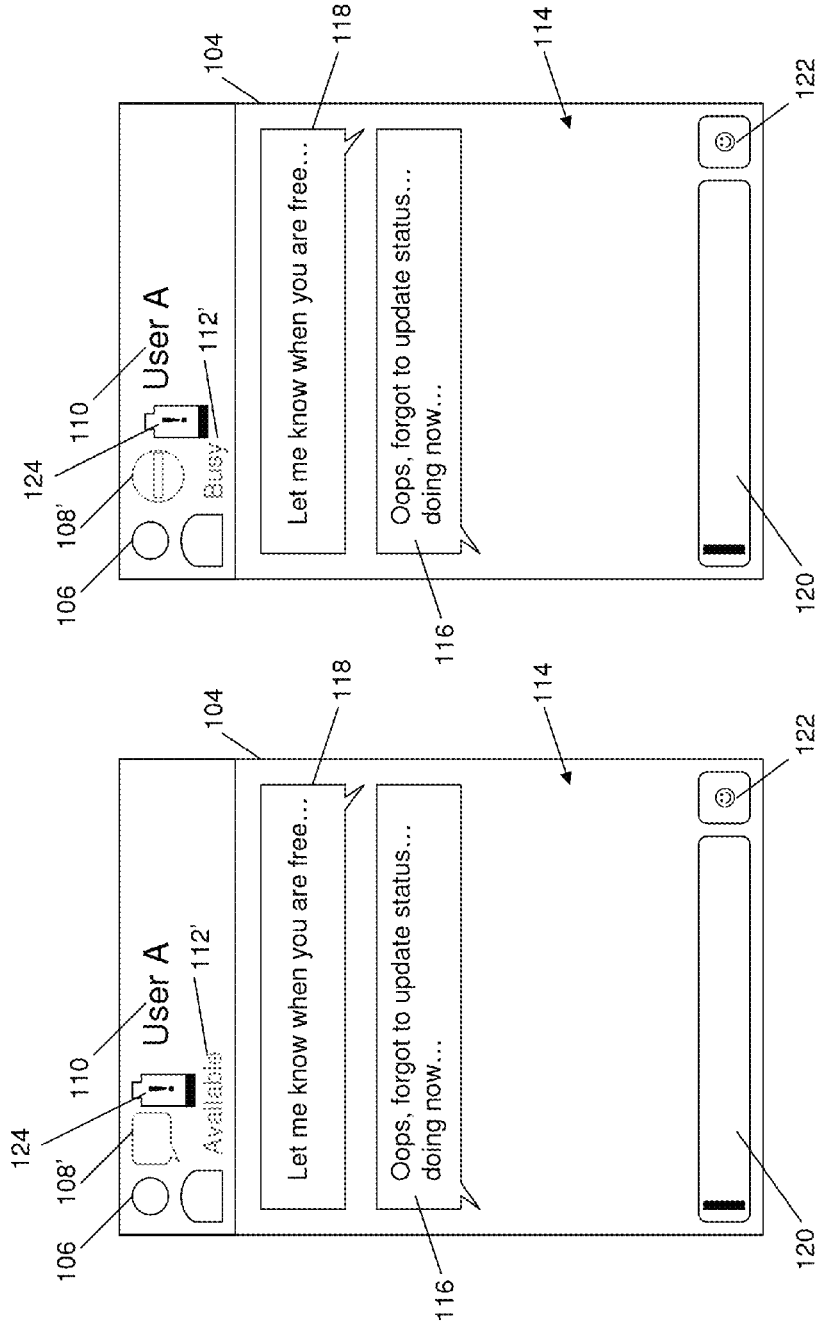

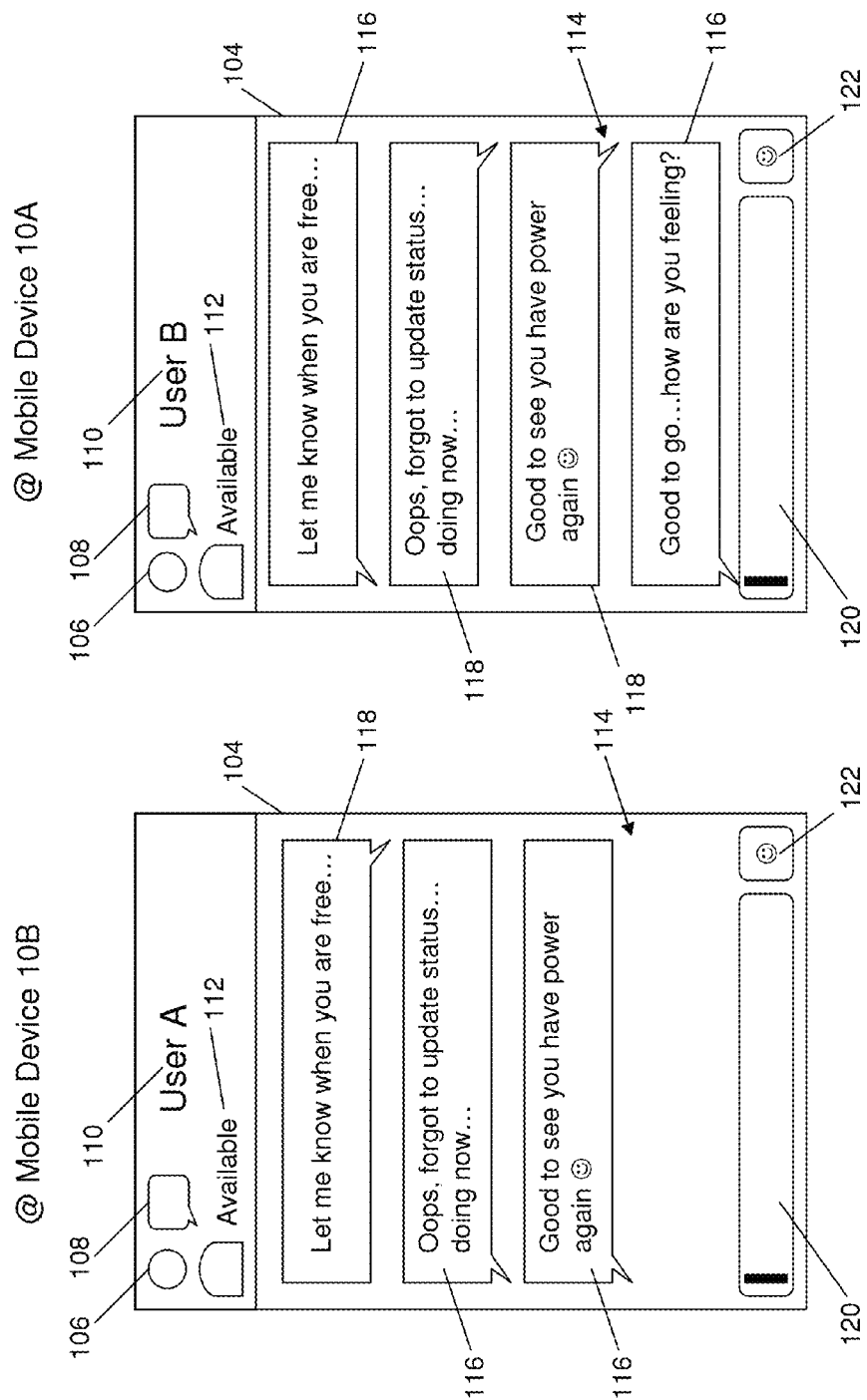

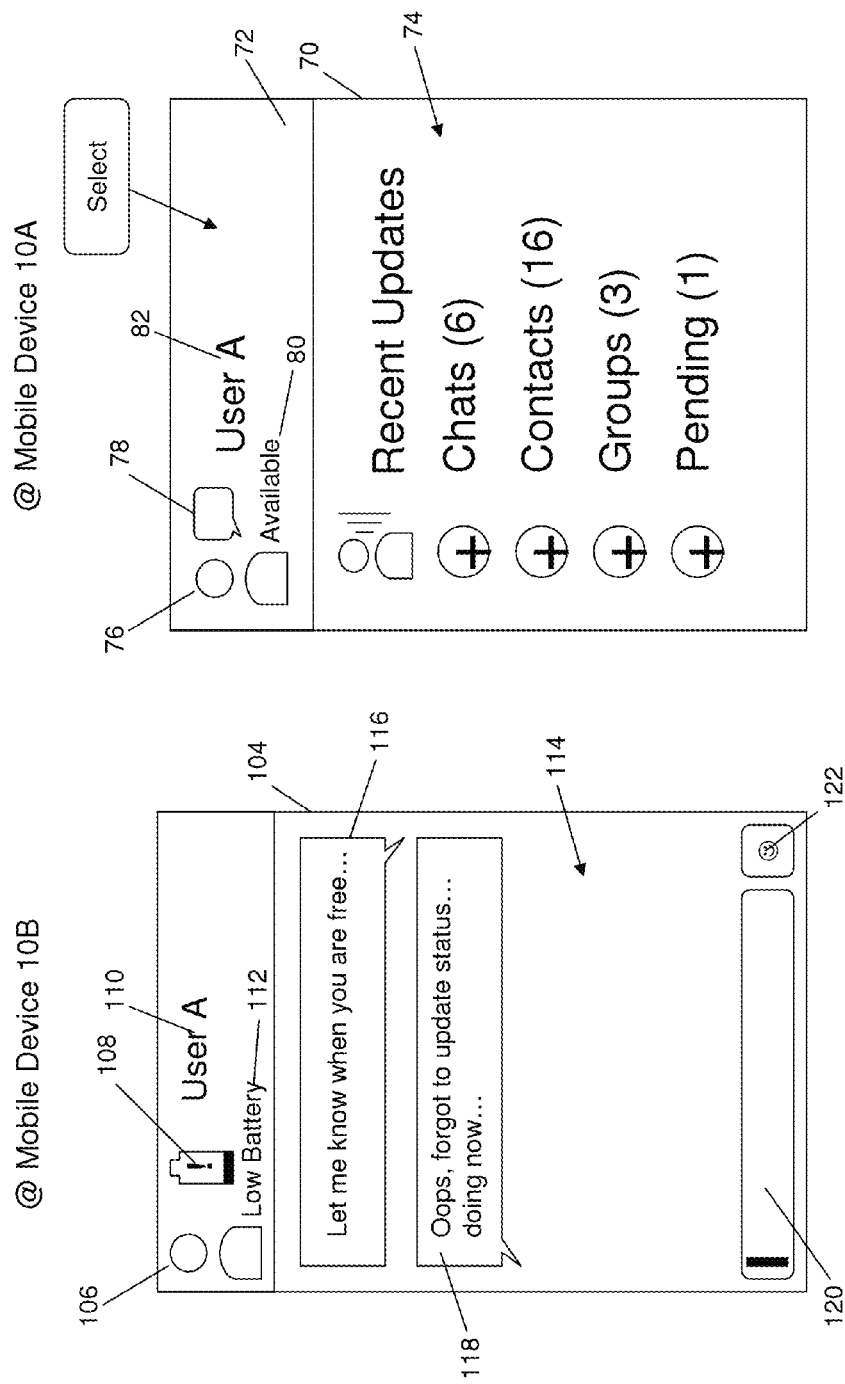

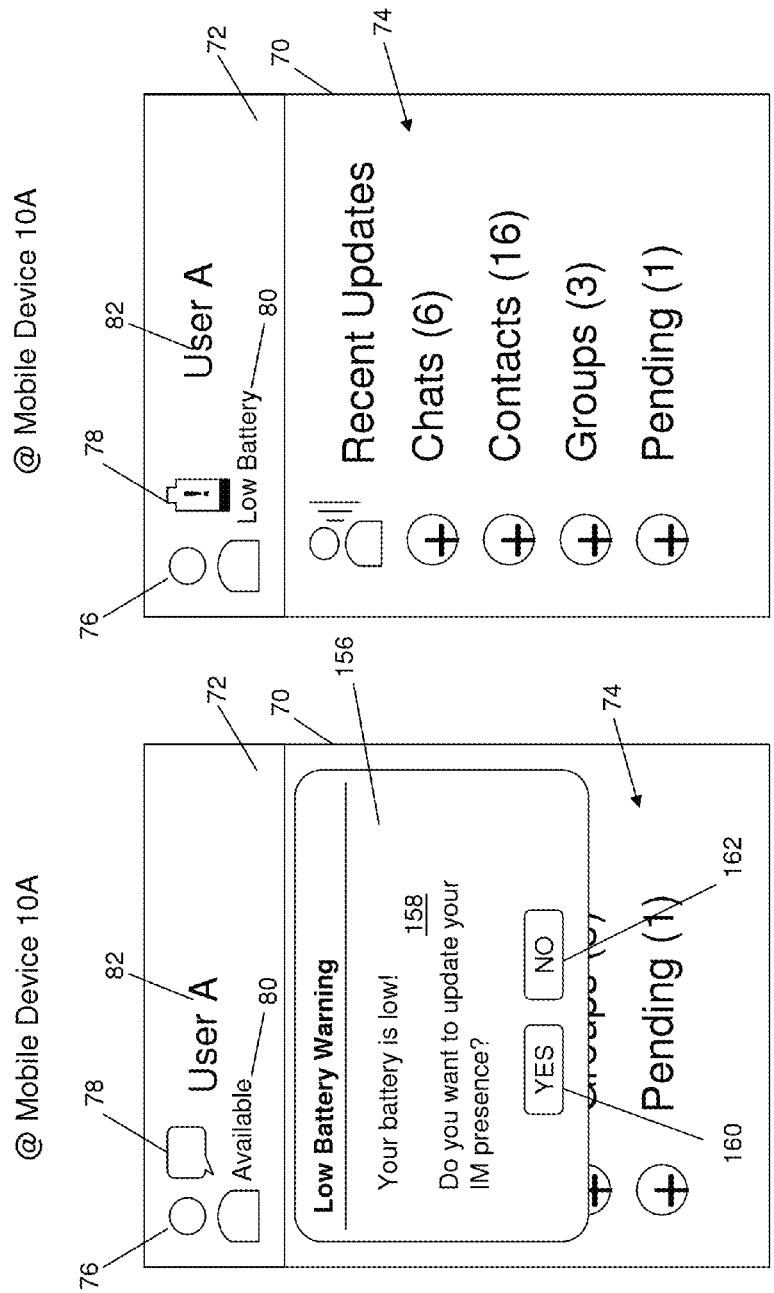

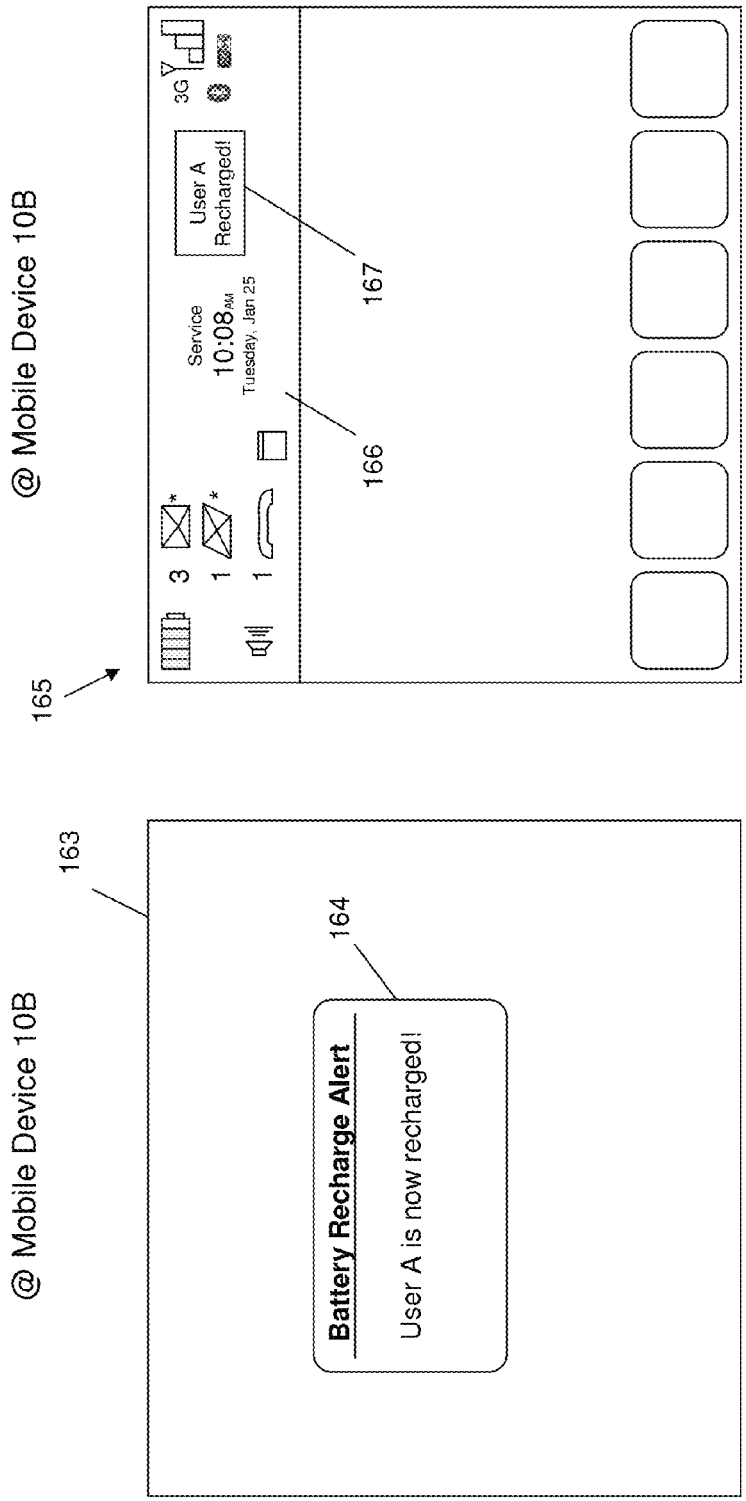

SYSTEM AND METHOD FOR PROVIDING LOW BATTERY NOTIFICATIONS ON MOBILE DEVICES

TECHNICAL FIELD

The following relates generally to systems and methods for providing low battery notifications on mobile devices.

BACKGROUND

Portable electronic communication devices such as cellular telephones, personal digital assistants (PDAs), smart phones, tablet computers, laptops, portable gaming devices, etc. typically rely on a portable energy source such as a battery to operate. When the communication device is being used to send and receive communications, a disruption in power can disconnect the user from those they are communicating with, sometimes without warning. Consequently, those they are communicating with may believe the user is being unresponsive since they are not aware of the low battery state.

BRIEF DESCRIPTION OF THE DRAWINGS

Embodiments will now be described by way of example only with reference to the appended drawings wherein:

FIG. 2 is a block diagram of an example communication of a multi-cast P2P message via the P2P system of FIG. 1.

FIG. 3 is a block diagram illustrating an example P2P message.

FIG. 4 is a block diagram illustrating one example configuration for the wireless infrastructure and P2P system shown in FIG. 1.

FIG. 7 is a screen shot of an example instant messaging (IM) user interface (UI).

FIG. 8 is a screen shot of an example UI for editing profile settings for an IM UI.

FIG. 9 is a screen shot of an example IM UI.

FIG. 10 is a screen shot of an example UI for conducting an IM conversation.

FIG. 11 is a screen shot of an example UI for conducting an IM conversation.

FIG. 12 is a screen shot of an example UI for conducting an IM conversation.

FIG. 15 is a screen shot of an example UI for conducting an IM conversation.

FIG. 16 is a screen shot of an example UI for conducting an IM conversation.

FIG. 17 is a screen shot of an example UI for conducting an IM conversation.

FIG. 18 is a screen shot of an example IM UI.

FIG. 23 is a screen shot of an example UI providing Low Battery Warning.

FIG. 24 is a screen shot of an example IM UI.

FIG. 25 is a screen shot of an example mobile device UI displaying a battery recharge alert.

FIG. 26 is a screen shot of an example mobile device home screen UI displaying a battery recharge alert in a banner of the home screen UI.

DETAILED DESCRIPTION OF THE DRAWINGS

Figure 1:
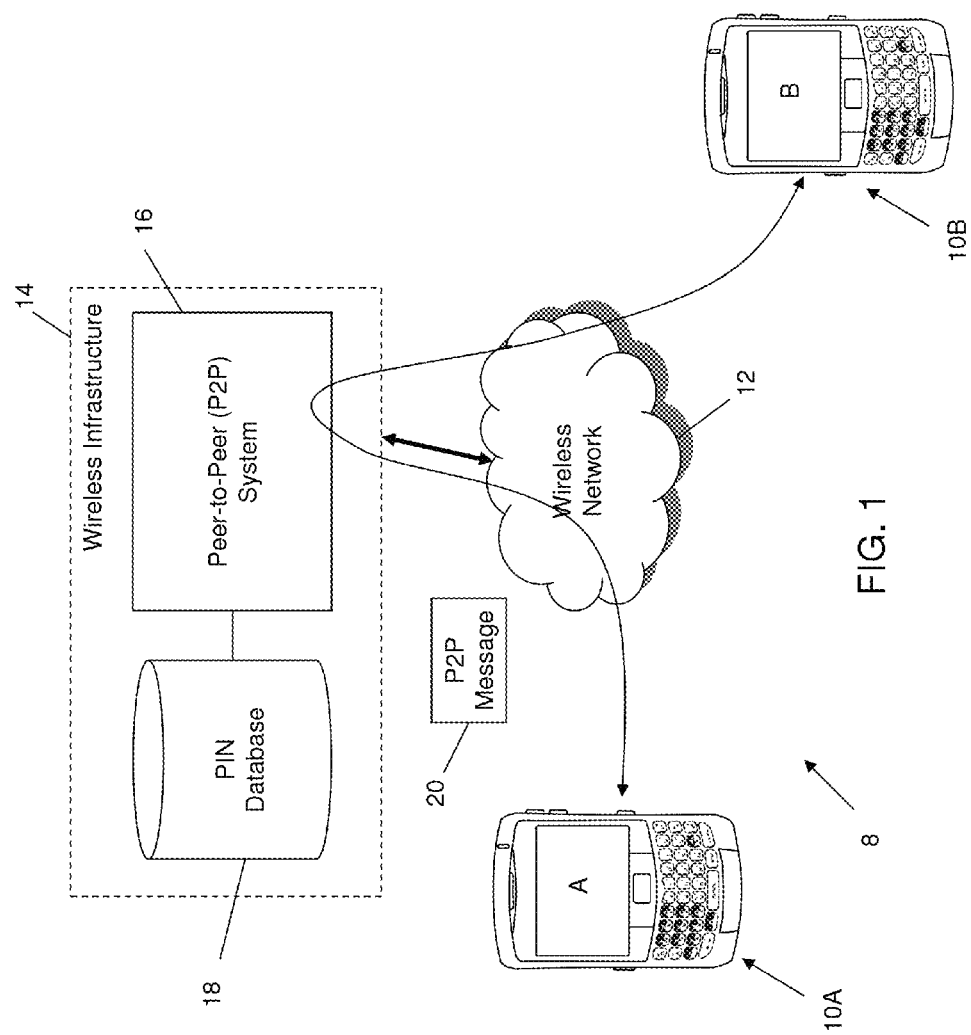
FIG. 1 is a block diagram of an example wireless communication system comprising a peer-to-peer (P2P) system.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practised without these specific details. In other instances, well-known methods, procedures and components have not been described in detail so as not to obscure the example embodiments described herein. Also, the description is not to be considered as limiting the scope of the example embodiments described herein.

To allow contacts or other correspondents in a messaging environment to be notified of a low battery state on a mobile electronic device, a message indicative of the low battery state can be sent to the other correspondents. By providing such a message in a presence update, an existing presence server can be used to provide a low battery presence update to multiple contacts.

The presence updates can be sent automatically to ensure that even if power is disrupted, the update can reach the other contacts and by detecting a resumption of power or "battery recharge state", the contacts can be notified when the low battery status has been resolved. The low battery state can be associated with a distinct presence status and have a distinct visual indicator, or may be augmented with a current presence status visual indicator to enable a convenient resumption of the presence status prior to the low battery state being disrupted.

Although the principles discussed below are applicable to any electronic communication device, examples will be provided for a mobile communication device, which is one of many types of electronic communication devices.

For clarity in the discussion below, mobile communication devices may be commonly referred to as "mobile devices" for brevity. Examples of applicable mobile devices may include, without limitation, cellular phones, smart-phones, wireless organizers, pagers, personal digital assistants, laptops, hand-held or other wireless communication devices, wirelessly enabled notebook computers, portable gaming devices, tablet computers, or any other portable electronic device with processing and communication capabilities.

Turning to FIG. 1, an example communication system 8 is shown. The communication system 8 in this example, at least in part, enables mobile devices, commonly referred to by numeral 10 (or using numeral 10 as a prefix—e.g. mobile device A, also denoted by 10A and mobile device B, also denoted by 10B), to communicate via a peer-to-peer (P2P) system 16 via a wireless network 12. It will be appreciated that two mobile devices 10A, 10B shown in FIG. 1 are for illustrative purposes only and many other mobile devices 10 (not shown) may also be capable of communicating with or within the communication system 8. It will also be appreciated that although the examples shown herein are directed to mobile communication devices, the same principles may apply to other devices capable of communicating with the P2P system 16. For example, an application (not shown) hosted by a desktop computer or other "non-portable" or "non-mobile" device may also be capable of communicating with other devices (e.g. including mobile devices 10) using the P2P system 16.

The P2P system 16 is, in this example, a component of a wireless infrastructure 14 associated with the wireless network 12. The wireless infrastructure 14 in this example comprises, in addition to the P2P system 16, and among other things not shown for simplicity, a person identification number (PIN) database 18. The PIN database 18 in this example is used to store one or more PINs associated with particular mobile devices 10, whether they are subscribers to a service provided by the wireless infrastructure 14 or otherwise.

The mobile device 10A may communicate with the mobile device 10B and vice versa via the P2P system 16, in order to perform P2P messaging or to otherwise exchange P2P-based communications, as will be explained in greater detail below. For ease of explanation, in the following examples, any P2P-based communication may also be referred to as a P2P message 20 as shown in FIG. 1.

In some embodiments, the P2P system 16 may be capable of sending multi-cast messages, i.e. forwarding a single message from a sender to multiple recipients without requiring multiple messages 20 to be generated by such sender. For example, as shown in FIG. 2, the P2P system 16 can be operable to enable a single P2P message 20 to be sent to multiple recipients by addressing the P2P message 20 to multiple corresponding P2P addresses, and having the P2P system 16 multicast the message 20 to those recipients. In the example shown in FIG. 2 a multicast approach enables the sender (mobile device 10A) to create or forward one message 20 in order to send the same data to multiple recipients (mobile devices 10B, 10C, and 10D for example).

An example P2P message 20 is shown in greater detail in FIG. 3, and has a format that is particularly suitable for a PIN-to-PIN based system. In a typical P2P protocol 38 (see also FIG. 4), each P2P message 20 has associated therewith a source corresponding to the mobile device 10 which has sent the P2P message 20 and includes a destination identifying the one or more intended recipients. Each P2P message 20 in this example comprises a body 24, which contains the content for the P2P message 20 (e.g. text or other data), and a header 22, which contains various fields used for transmitting and processing each P2P message 20. In this example, the header 22 includes a message type field 26 to specify the type of transmission (e.g. chat, registration, block, presence, etc.), a source field 28 to specify the device address for the sender, a destination field 30 to specify the device address(es) for the one or more intended recipients, an ID field 32 to identify the corresponding P2P application and a timestamp field 34 to indicate the time (and if desired, the date) at which the P2P message 20 was sent by the designated sender.

It can be appreciated that in this example, the ID field 32 can be used to specify the application ID to identify a P2P application on the mobile device 10. Where the P2P application relates to, for example, an instant messaging (IM) system, the message type field 26 can also be used to designate an IM communication, and the ID field 32 would then correspond to a conversation ID, i.e. a conversation thread the message 20 corresponds to (e.g. such that each message 20 is identified by the conversation in which the message was sent).

It will be appreciated that other information or attributes may be included in the P2P message 20, such as a subject field (not shown) to enable a subject for part or all of a conversation (such as, for example, in an IM implementation) to be transported with the P2P message 20 (e.g., to create new subjects, modify subjects, notify others of subjects, etc.), or application details field (not shown) to provide application-specific information such as the version and capabilities of the application.

Turning now to FIG. 4, an exemplary configuration is shown that is suitable for a user of mobile device A, hereafter referred to as mobile device 10A, to conduct a P2P communication (e.g., instant messaging) with buddies included in a contact list (not shown). In FIG. 4, the P2P system 16 is incorporated into the wireless infrastructure 14 of the wireless network 12. The P2P system 16 can utilize any suitable P2P protocol 38 operated by a P2P messaging router 36, shown in this example as part of the wireless infrastructure 14. It can be appreciated however, by those skilled in the art, that a stand-alone P2P configuration (i.e. that does not rely on the wireless infrastructure 14—not shown) may equally apply the principles disclosed herein. The example configuration shown in FIG. 4 is particularly suitable for implementing a PIN-based messaging system. As can be seen, the P2P messaging router 36 may also enable mobile devices 10 to communicate with desktop computers 40 thus facilitating, for example, communications such as instant messaging (IM) between mobile applications and desktop applications on the desktop computer 40.

In the example illustrated in FIG. 4, a P2P-based messaging system such as a PIN-based messaging system can be implemented using a router-based communication infrastructure, such as one that provides email, short message service (SMS), voice, Internet and other communications. Particularly suitable for hosting the P2P messaging router 36, is a wireless router or server used in systems such as those that provide push-based communication services. In FIG. 4, the wireless infrastructure 14 facilitates P2P communications such as instant messaging between mobile device 10A and mobile devices for User B, User C and User D, denoted by 10B, 10C and 10D respectively using the P2P messaging router 36. It will be appreciated that the number of users participating in the example shown in FIG. 4 is for illustrative purposes only. P2P messaging, such as IM, is provided by an associated application stored on each mobile device 10A-10D which can be initiated, for example, by highlighting and selecting an icon from a display as is well known by those skilled in the art. The P2P messaging router 36 routes messages between the mobile devices 10A-10D according to the P2P protocol 38. For example, the P2P protocol 38 may define a particular way in which to conduct IM or other types of messaging.

In general, in a P2P protocol 38, the sender of the P2P message 20 knows the source address of the intended recipient, e.g. a PIN. This may be established when the two devices request to add each other to their respective contact or buddy lists. It can be seen in the example shown in FIG. 4 that mobile device 10A can communicate directly with any of the mobile devices 10B-10D through the P2P messaging router 36 as indicated by the short-dashed line without requiring a dedicated server for facilitating communications. In other words, the P2P messaging router 36 enables the mobile devices 10 to communicate with each other directly over the wireless infrastructure 14 in accordance with the P2P protocol 38.

When conducting a P2P session according to the example shown in FIG. 4, the mobile devices 10A-10D can communicate directly with the wireless infrastructure 14 in a client based exchange where, as noted above, an intermediate server is not required. A P2P message 20 sent by one mobile device 10 is received by the wireless infrastructure 14, which obtains the source address for the intended recipient (or recipients) from information associated with the message 20 (e.g., a data log) or from the message 20 itself. Upon obtaining the recipient's address according to the P2P protocol 38, the wireless infrastructure 14 routes the message 20 to the recipient associated with the mobile device 10 having such address (or recipients having respective addresses). The wireless infrastructure 14 typically also provides a delivery confirmation to the original sender, which may or may not be displayed to the user. The destination device can also provide such delivery information. The wireless infrastructure 14 should be capable of routing P2P messages 20 reliably and hold onto (i.e. store, at least temporarily) the P2P messages 20 until they are successfully delivered. Alternatively or additionally, if delivery cannot be made after a certain timeout period, the wireless infrastructure 14 may provide a response indicating a failed delivery. The wireless infrastructure 14 may choose to expire a message 20 if a certain waiting period lapses.

Figure 5:
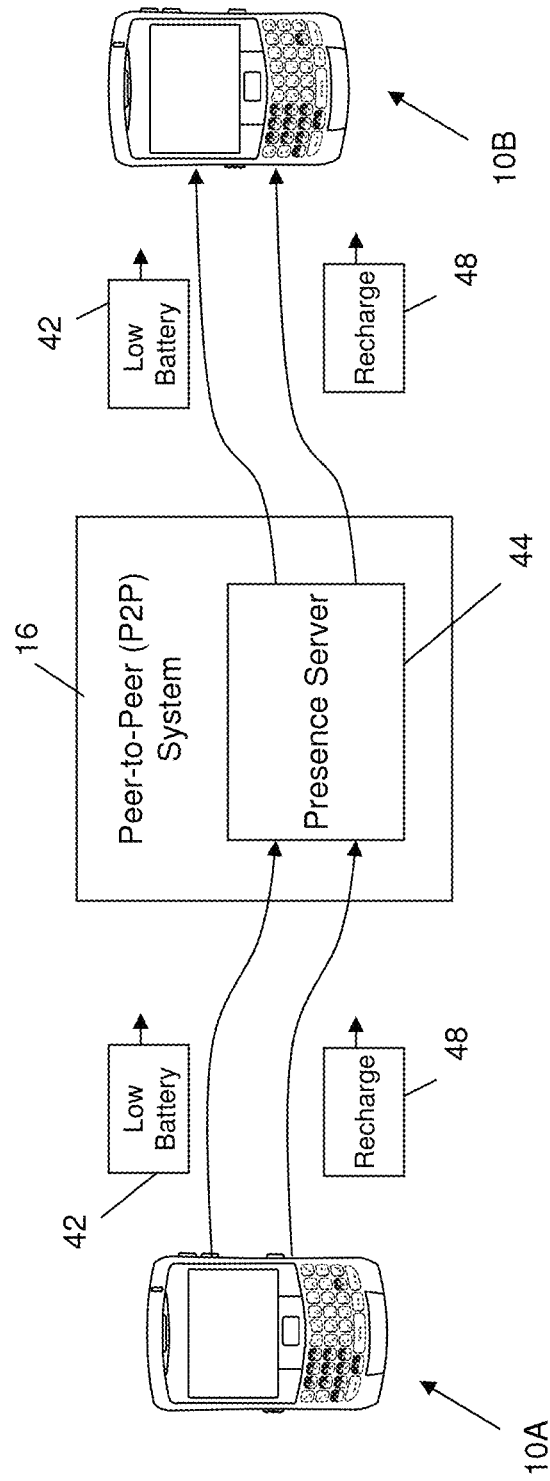
FIG. 5 is a block diagram illustrating an example provision of low battery and recharge messages via a presence server.

FIG. 5 illustrates an exemplary presence server 44 which, in this example is part of the P2P system 16. The presence server 44 is operable to provide a presence service, which accepts, stores, and distributes presence information, in this example, for client devices connectable to the P2P system 16. In the example shown in FIG. 5, a low battery presence update 42 is sent by mobile device 10A to the presence server 44. The presence server 44 may update its own database, determine if any of mobile device 10A's contacts are to receive presence updates, and provide the low battery update 42 to such contacts. In this example, for brevity, the low battery update 42 is forwarded to mobile device 10B and it can be appreciated that one or more additional contacts may also receive the low battery update 42. The low battery update 42 sent by mobile device 10A may therefore be modified to be addressed to multiple recipients (e.g., in a multi-cast message), may be combined with other presence updates (not shown), and the provision thereof may be controlled according to various network management schemes.

The mobile device 10A is also operable in the example shown in FIG. 5 to send a recharge update 48 to the presence server 44, e.g., upon detecting that the mobile device's 10A battery level has returned to a particular level. The recharge update 48 may therefore be indicative of any resumption or re-establishment of power for the mobile device 10A and be used to counteract the low battery update 42 previously sent. As such, it can be appreciated that the term "recharge" may refer to any one or more of a recharge of a battery source (or partial recharge), a temporary connection to a power source (e.g., via an AC adapter), the insertion of a different battery, etc. The presence server 44 may then update its own database and send the recharge update 48 to one or more contacts as explained above with respect to the low battery update 42. The updates 42, 48 can be used in various ways by the receipt thereof. For example, when used with an IM-based or other P2P-based application, each mobile device 10 may provide visual indications of presence for contacts in a contact list and thus may use the updates 42, 48 to make appropriate changes to a UI for that application. As such, the updates 42, 48 may comprise a value or instruction enabling an application to update a corresponding UI in a particular way.

Figure 6:
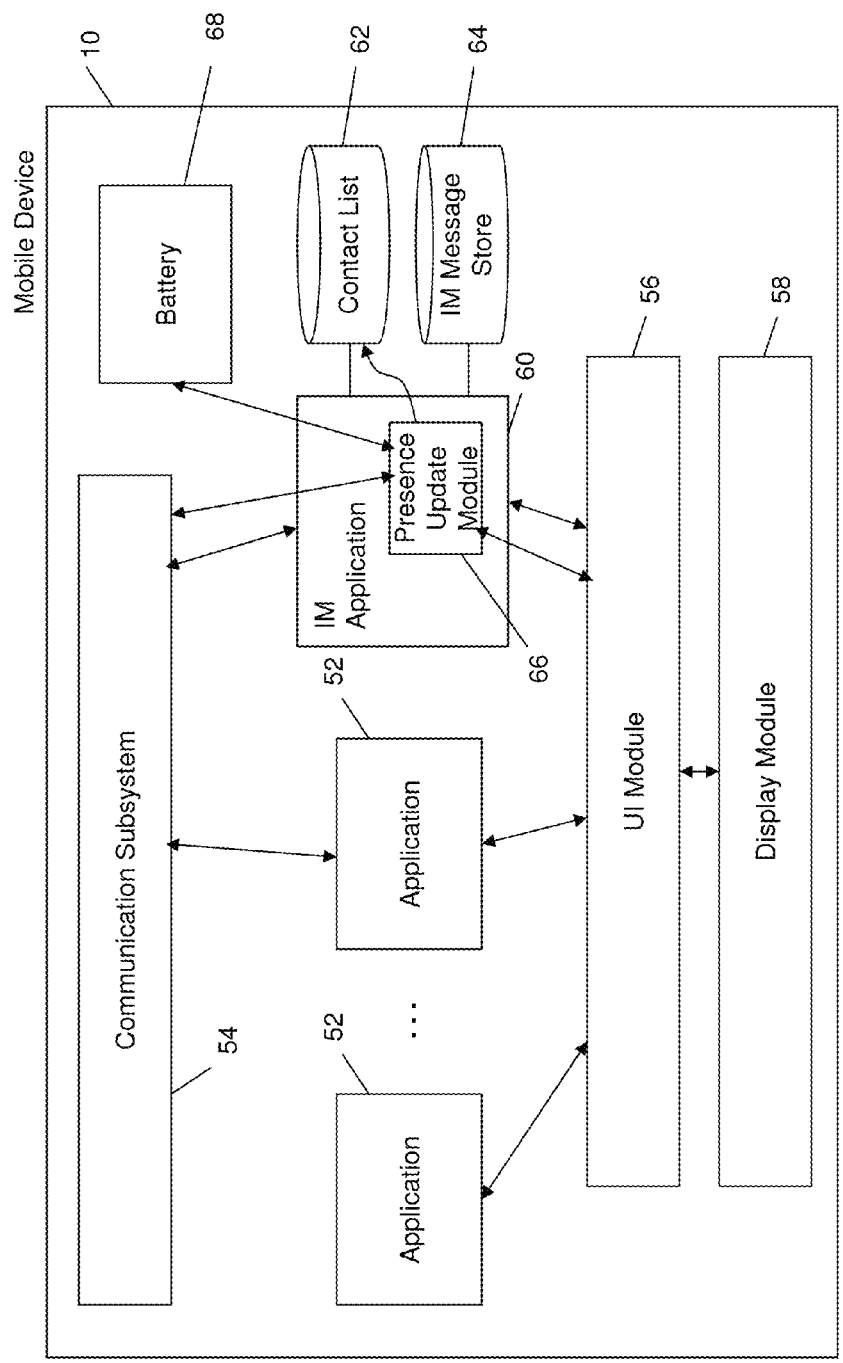
FIG. 6 is a block diagram illustrating an example configuration for a mobile device operable to update presence information according to battery status.

Turning now to FIG. 6, an example configuration for a mobile device 10 is shown. In this example, a communication subsystem 54 is provided in order to enable the mobile device 10 to access communication networks such as the wireless network 12 shown in FIGS. 1 and 4. Various applications 52 may be operable on the mobile device 10 as shown and at least one or more of such applications 52 may access the communication subsystem 54 in order to participate in sending and/or receiving of data such as in a data communication. The applications 52 may also access a UI module 56 for providing UI data on a display of the mobile device 10 using a display module 58. An IM application 60 is also shown specifically in FIG. 6. The IM application 60 comprises, or otherwise has access to, a contact list 62 which may store a list of contact information for one or more corresponding contacts, also referred to as "buddies". The IM application 60 also comprises or otherwise has access to an IM message store 64 for storing data and information for IM conversations conducted between a user of the mobile device 10 and one or more of its contacts.

The IM application 60 also comprises, or is otherwise programmed or functional to include, a presence update module 66. The presence update module 66 in this example is operable to update presence information for contacts in the contact list 62, and updates may be performed in both the contact list 62 data and the UI for the IM application 60. The presence update module 66 can be operable to receive presence updates from, for example, the presence server 44, in order to update such presence information. The presence update module 66 in this example is also operable to detect, determine or otherwise become aware of a low battery state for power source of the mobile device 10, in this example, a battery 68. For example, the battery 68 may report its current level to an operating system (OS) 234 (see also FIG. 29) to enable a UI for the mobile device 10 to be updated periodically and such information may be referenced by the presence update module 66 in order to determine the low battery state. The battery level may also be reported directly to the presence update module 66 by the battery 68 itself, the OS 234, or any other component, module or service that has access to such information.

FIG. 7 illustrates a screen shot of an example IM UI 70. In this example IM UI 70, a banner 72 is provided as a header for a menu 74. The menu 74 includes a list of categories and options, which may be selected in order to access existing IM conversations, begin new IM conversations, access particular contacts, view pending requests (e.g., for adding new contacts), to view recent updates to contact information, etc. The banner 72 in this example includes an image 76 which may be selected to be representative of a user associated with the mobile device 10 on which the IM UI 70 is provided. The banner 72 also includes a presence status icon 78 and a presence status description 80 or any other suitable visual indicator indicative of a selected or otherwise applied IM status for that user. It can be appreciated that any combination of icon 78, description 80, or other visual indicator, in any orientation or proportion can be used to provide a visual indication of a presence status for the IM application 60. The banner 72 also includes, in this example, a display name 82 associated with the user of the mobile device 10 on which the IM UI 70 is provided.

By selecting at least a portion of the banner 72 (or by invoking a menu, short-cut key, etc.), an IM profile UI 84 such as that shown in FIG. 8 may be displayed. The IM profile UI 84 in this example provides an image preview 86 for the image 76 shown in the banner 72, and a character entry box 88 for adding or editing the display name 82 in the banner 72. A PIN label 90 is also shown, which can be used to indicate a PIN associated with the mobile device 10, e.g. for conducting P2P messaging as discussed above. A PIN barcode (not shown) can also be displayed to enable other mobile devices 10 to scan the PIN barcode to obtain the PIN, by selecting a Show button 92. A personal message 94 can also be entered in this example, which may be displayed in the IM UI 70. A status selection mechanism 96 is also provided, to enable selection from a list of one or more presence statuses or, as shown below, to create new presence statuses. It can be appreciated that the status selection mechanism 96 may provide a pull down list or other embedded UI components or may invoke the display of a separate UI.

Various checkboxes may also be provided in the IM profile UI 84, as shown by way of example in FIG. 8. For example, a first check box 98 can be provided to enable the user to share what music or other audio content they are listening to, a second check box 100 can be provided to enable the user to selectively show their location and/or time zone information. A third check box 102 in this example enables the user to selectively show a low battery status to other users (i.e. contacts) automatically.

It can be appreciated that an automatic provision of a low battery update 42 can be particularly advantageous in allowing the contacts to be notified prior to a complete loss of battery power, which would prevent the user from notifying their contacts, e.g., by a presence update prior thereto, resulting in an abrupt change of status without an explanation. By proving the low battery update 42 when the battery level reaches a predetermined level, this scenario can be avoided.

By selecting the third checkbox 102 as shown in FIG. 8, the presence update module 66 can be set, programmed, or otherwise instructed to monitor or determine, at least periodically, a current battery level (i.e. an amount of battery power remaining relative to a complete or full amount) for the battery 68, generate a low battery update 42 when detecting that the battery level falls below a first predetermined threshold, and generate a recharge update 48 when detecting that the battery level reaches or exceeds a second predetermined threshold. The second predetermined threshold may be the same level as the first predetermined threshold, or may be a greater level to ensure the battery level has recovered to a point where the mobile device 10 may resume communications in a reliable manner. The presence update module 66 or other component or module of the IM application 60 provides the low battery update 42 and recharge update 48 to the communication subsystem 54 to have sent to the presence server 44 for updating one or more contacts accordingly. In addition to sending the low battery updates 42 and recharge updates 48, the presence update module 66 can also instruct the UI Module 56 to update the IM UI 70 to also provide an indication on the mobile device 10 that the battery 68 is in a low battery state. In this way, not only do contacts get updated regarding the low battery state but the user can also be notified in order to enable remedial action to be taken such as a recharge of the battery 68.

FIGS. 9 through 18 illustrate an example use of a low battery state detected on the battery 68 of mobile device 10A to provide a presence update to a User B associated with mobile device 10B and to update the IM UI 70 for mobile device 10A.

FIG. 9 illustrates an example screen shot of the IM UI 70 when mobile device 10A is not currently in a low battery state and thus the presence icon 78 and description 80 indicate a chosen IM status, in this example, "Available". By expanding the "Chats" heading in the menu 74 and choosing a conversation (also referred to as a "chat") with User B (associated with mobile device 10B in this example), or by expanding the "Contacts" or "Groups" headings and beginning a new conversation or chat with User B or a group comprising User B, a conversation UI 104 such as that shown in FIG. 10 may be initiated. In the example shown in FIG. 10, a contact image 106, contact presence icon 108, and contact presence description 112 for User B, as well as a display name 110 for User B are shown in a conversation header or banner 113. It can be seen that when chatting with User B, the presence and display details associated with User B's profile are visible to User A.

A conversation body 114 includes, in this example, an outbound message 116 comprising text entered by User A and sent to User B at mobile device 10B. An inbound message 118 is also shown in this example, comprising text sent to mobile device 10A by mobile device 10B. Characters may be entered by User A using a entry box 120 and emoticon button 122. In the example conversation shown in FIG. 10, User A has sent a message to User B asking User B to indicate when they are free, due to a perceived unavailability based on the "Busy" presence status showing in the conversation UI 104. A reply, included in the first inbound message 118 indicates that User B forgot to update their status. It can therefore be appreciated that the presence status information such as the visual indicators provided by the contact presence icon 108 and contact presence description 112 may be relied upon to determine a contact's likely availability and responsiveness and thus having current and accurate status information can improve the conversation experience.

The same conversation shown in FIG. 10 is shown from the perspective of mobile device 10B in FIGS. 11 and 12. In FIG. 11, the contact presence icon 108' and contact presence description 112' are "greyed out" or otherwise altered to be distinguishable from a normal operating state and the contact presence icon 108' is augmented with a battery icon 124. In this example, the battery icon 124 provides a visual indication of a low battery state by showing a battery with a relatively low "level" (illustrated using a black band). It can be appreciated that the battery icon 124 shown in FIG. 11 is only one example and various other indicators can be used, such as a textual indicator, a modification of the color of the existing presence icon 108' and/or presence description 112', etc. In FIGS. 11 and 12, the inbound messages 118 correspond to the outbound messages 116 seen at mobile device 10A and vice versa. Also, the presence status icon 108' and description 112' associated with User A and mobile device 10A are shown.

FIG. 11 illustrates one example, wherein the battery icon 124 is augmented with the last known presence status icon 108' and description 112' for User A. In FIG. 12, the presence status for User A is changed to "Busy" in addition to augmenting the battery icon 124. Such a change may be done automatically, e.g., by including an instruction or other update in the low battery update 42. By both updating the contact presence icon 108' and description 112' and augmenting them with the battery icon 124, the overall notification provided to the contacts with respect to the low battery state can be enhanced.

Figures 13, 14:
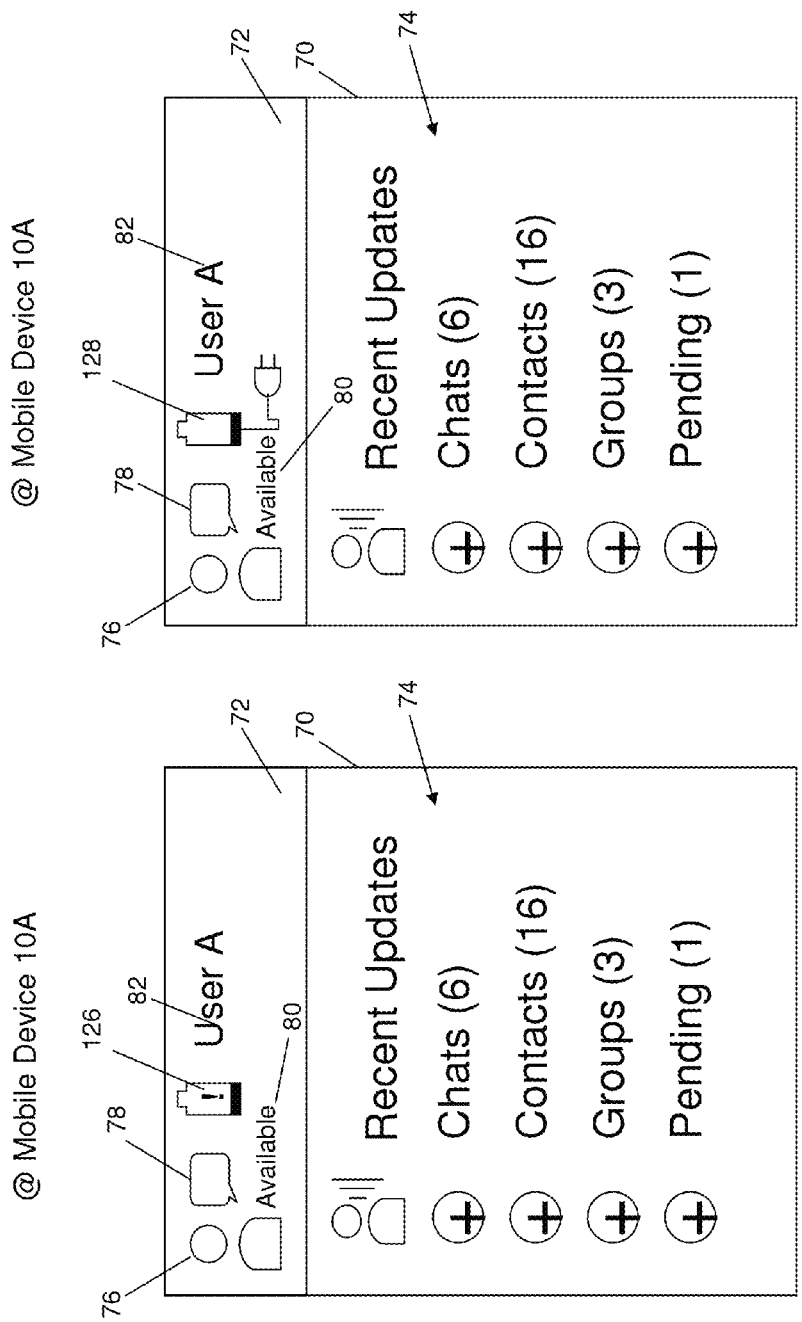
FIG. 13 is a screen shot of an example IM UI.
FIG. 14 is a screen shot of an example IM UI.

FIG. 13 again illustrates the IM UI 70 at mobile device 10A. It can be seen that a local battery icon 126 can be augmented with the current presence icon 78 and description 80 as shown to notify User A of the low battery state, in addition to notifying User A's contacts by way of the low battery update 42. It can be appreciated that, similar to what was illustrated in FIG. 12, the presence status for User A can also be automatically updated, e.g, to show as "Busy". By visibly recognizing the low battery state, e.g., via the local battery icon 126 or other battery indicator (e.g., on a home screen or other banner or header), User A may seek to rectify the low battery state by recharging the battery 68. FIG. 14 illustrates a recharge icon 128, which can replace the local battery icon 126 upon the presence update module 66 detecting that the battery 68 is being charged. In this way, a transitional state can be displayed until the low battery state has been rectified (e.g., once the battery level meets or exceeds a predetermined level). It can be appreciated that the recharge icon 128 can also be displayed by User A's contacts, e.g., by sending an additional low battery update 42 or a provisional recharge update (not shown).

Further progression of the conversation illustrated in FIGS. 10 through 12 is shown in FIGS. 15 and 16. FIG. 15 illustrates that, once the battery 68 for mobile device 10A has been recharged, a recharge update 48 sent by mobile device 10A to the presence server 44 can cause the conversation UI 104 at mobile device 10B to be further updated to show that the low battery state has been rectified or otherwise no longer exists. In this example, User B sends a further outbound message 116 in response to observing that the low battery state has been resolved. FIG. 16 illustrates the same conversation from the perspective of mobile device 10A and shows a further outbound message 116 from User A in response to the previous message sent by User B. It can be appreciated that by automatically updating presence status for mobile device 10A, not only can User A determine when to rectify the low battery state, but other contacts, such as User B, can be better informed of potential unresponsiveness in the IM conversation 114. By automatically updating the presence status using the recharge update 48, User A's contacts can also promptly determine when a better time to respond may be.

As discussed above, the low battery state may also be conveyed by using a separate and distinct low battery presence icon 108 and presence description 112 as shown by way of example in FIG. 17. In this example, rather than augmenting an existing presence status with the low battery state indicators, a presence status change is made. It can be appreciated that both augmenting a battery icon 124 as shown in FIGS. 11 to 14 and a separate presence status associated with the low battery state can also be used together. For example, a separate low battery presence status can be used in some circumstances (e.g. when selected by the user), and the augmenting of the battery icon 124 used in other circumstances (e.g. when the battery level falls below the predetermined threshold). Also, whether to augment the battery icon or use a separate presence status may also be user configurable, application configurable, OS configurable, etc. in order to define when to indicate a low battery state by augmenting the battery icon 124 and when to use a change in presence status. For example, if a user plugs their mobile device 10 into a charger while keeping the mobile device 10 running, the augmentation of the current presence status indicators with the battery icon 124 may be used whereas a loss of power or shut down of the mobile device 10 could be used to trigger a complete change in presence status.

Figures 19, 20:
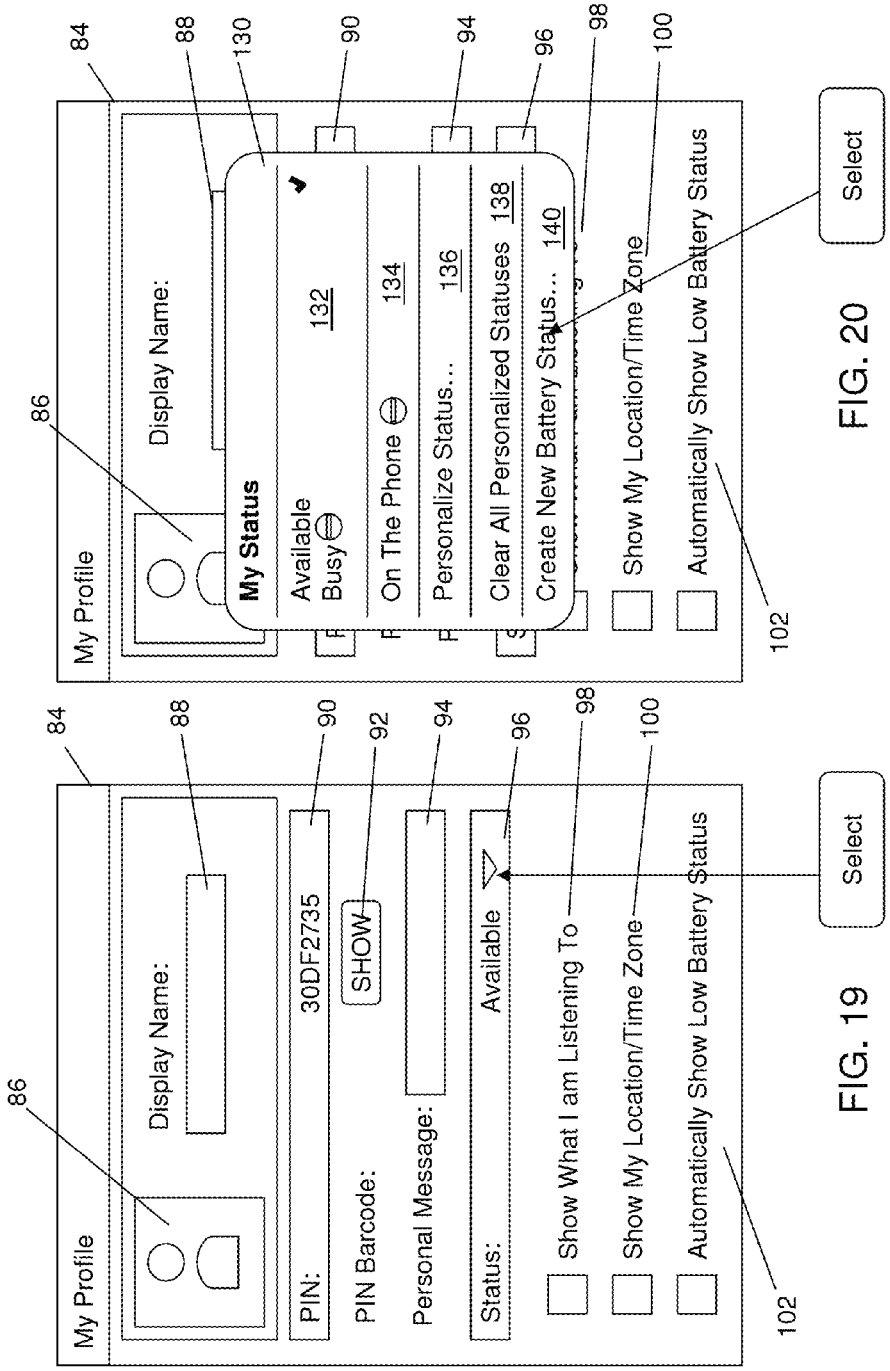
FIG. 19 is a screen shot of an example UI for editing profile settings for an IM UI.
FIG. 20 is a screen shot of a My Status selection UI.

As noted, the low battery state can be represented using a distinct presence status. FIGS. 18 to 24 illustrate an exemplary creation and use of a low battery presence status by manually selecting a low battery presence status option. FIG. 18 illustrates the IM UI 70. By selecting the banner 72 as shown, the IM profile UI 84 is displayed as shown in FIG. 19. In this example, the third checkbox 102 is de-selected and thus the low battery updates 42 would not be sent automatically. Instead, by selecting the status selection mechanism 96, a My Status UI 130 is displayed as shown in FIG. 20. The My Status UI 130 provides a first portion 132 listing default or pre-loaded presence statuses, each of which may be selected; a second portion 134 that lists any custom statuses created by the user, which may also be selected; a third portion 136, which may be selected in order to create or personalize a new presence status; a fourth portion 138, which may be selected to clear personalized presence statuses listed in the second portion 134; and a fifth portion 140, which may be selected to create a new battery status. It can be appreciated that the fifth portion 140 is shown separately in FIG. 20 for illustrative purposes only and an option to create a new battery status may also be incorporated into the personalize status option selectable in the third portion 136.

Figures 21, 22:
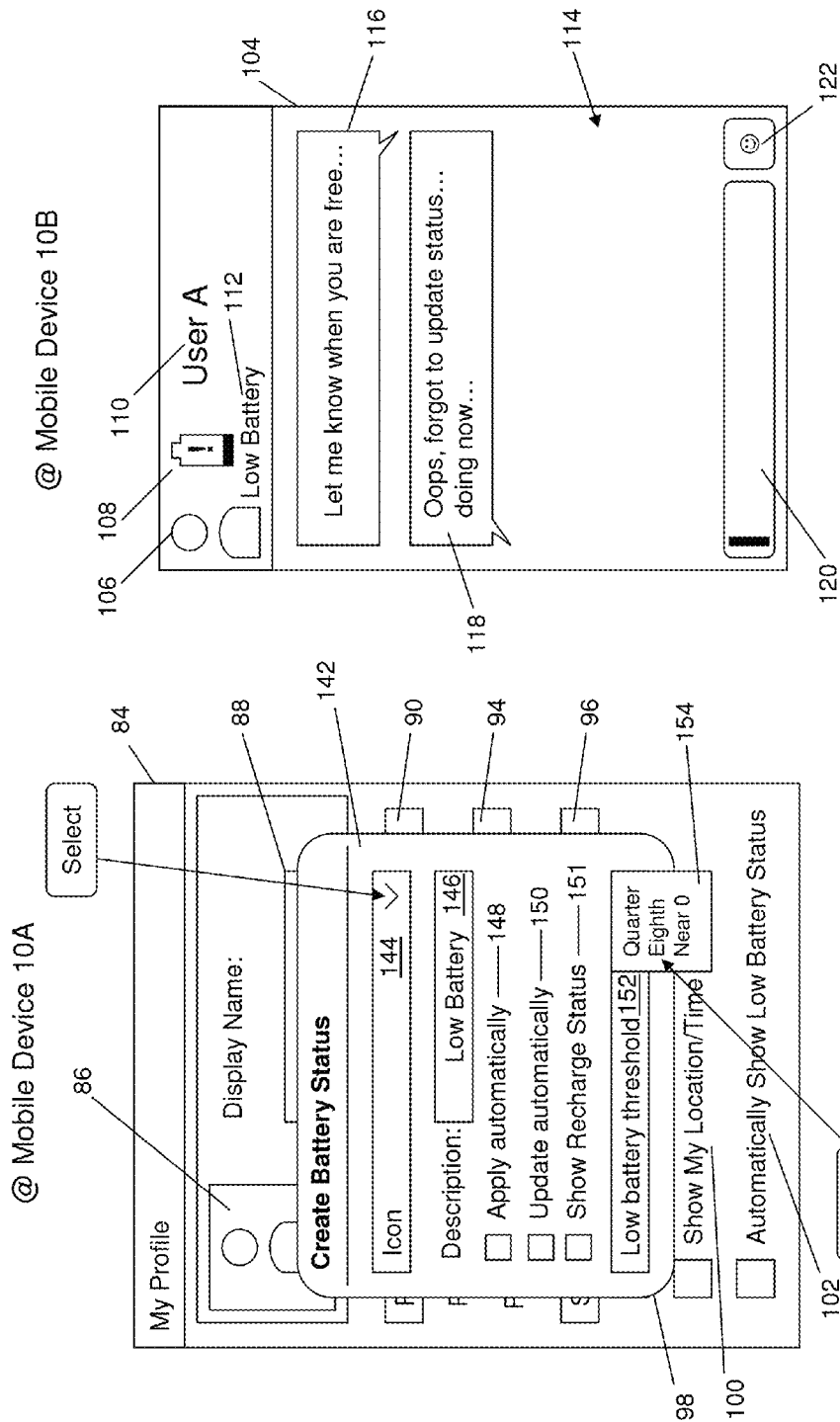
FIG. 21 is a screen shot of a Create Battery Status UI.
FIG. 22 is a screen shot of an example UI for conducting an IM conversation.

By selecting the create new battery status option in the fifth portion 140 as shown in FIG. 20, a Create Battery Status UI 142 is displayed as shown in FIG. 21. The Create Battery Status UI 142 includes an icon selection mechanism 144, which may be used to provide a plurality of options for visually indicating the low battery state, e.g., the battery icons 124, 126. A description entry box 146 is also provided to enable the user to customize the presence description 80, 112. A first checkbox 148 can be selected to enable the change of presence status to the low battery status automatically. A second checkbox 150 can also be selected to enable the presence status to be updated when the low battery status has been rectified (e.g., by reverting to "Available" or a previously used presence status). It can be appreciated that the first and second checkboxes 148, 150 in this example have a different effect than the third checkbox 102 in the IM profile UI 84 in that the automatic changeover to the low battery status, and subsequent automatic update when resolved, involve changing the presence status as shown in FIG. 22 rather than augmenting the current presence status with the low battery icons 124, 126 as previously illustrated. It can also be appreciated that automatic application of the augmented battery icons 124, 126 and the automatic changeover to a low battery presence status can both be used in different circumstances as noted above and thus one does not need to supersede the other.

A third checkbox 151 shown in FIG. 21 enables the user to have the low battery presence status updated to show a recharge status, e.g., by modifying the presence icon 108 in a manner similar to the way the battery icon 126 was modified to indicate a recharge as shown in FIG. 14. A low battery threshold selection mechanism 152 is also provided in this example, in order to provide a list of threshold options 154. In this example, the user may adjust the battery level threshold at which the low battery state is triggered to be any one of ¼ capacity, ⅛ capacity or a "near zero" level. It can be appreciated that such levels are illustrative only and various additional or different levels can be presented or a fully customizable option (e.g., by entering an exact percentage or voltage level) can be provided.

By enabling a separate low battery presence status to be created and used, not only can contacts be advised of a low battery state, but the user can be given the option of manually setting their current presence status to be the low battery status. In this way, the user can override the low battery threshold or use the low battery presence status as another way to indicate they are unreachable or otherwise busy. In order to both enable manual control of the low battery presence status, and to ensure the user is notified in advance of an actual power loss, a low battery warning 156 can be displayed by the presence update module 66, as shown in FIG. 23, upon detecting that the battery level is below the predetermined threshold. In this example, the low battery warning 156 includes a textual warning 158 in a UI element (e.g. pop-up window), which asks the user whether or not they wish to update their presence status accordingly. In this example, a YES button 160 and a NO button 162 are provided to enable the user to conveniently cause a presence status change without having to go through the additional steps of accessing the IM UI 70, accessing the IM profiles UI 84, etc. It can be appreciated that although the low battery warning 156 is shown overlaid on the IM UI 70, such a warning can also be displayed in other applications or screens, such as the home screen to enable the user to quickly update their presence status to indicate the low battery state. In this way, the presence status can be appropriately updated before a loss of power takes place.

By selecting the YES button 160 in FIG. 23, the IM UI 70 can be updated as shown in FIG. 24 to include the low battery presence status. A low battery update 42 can also be sent at the same time to update User A's contacts.

User A's contacts may also be alerted when their low battery state has been rectified. For example, as shown in FIG. 25, upon receiving a recharge update 48, mobile device 10B may provide, in any UI 163, a battery recharge alert 164 to notify User B that User A's mobile device 10A has been recharged. In this way, User B does not necessarily have to access the IM UI 70 in order to determine that this has occurred. It can be appreciated that the alert may be displayed in various ways. For example, as shown in FIG. 26, a recharge alert icon 167 can be displayed in a banner 166 of a home screen 165. Various other examples may include, without limitation, a tactile or auditory alert, or any suitable visual mechanism in any available UI. It can also be appreciated that whether or not a battery recharge alert 164 or recharge alert icon 167 is displayed can be controlled via user preferences, default settings, etc.

Figure 27:
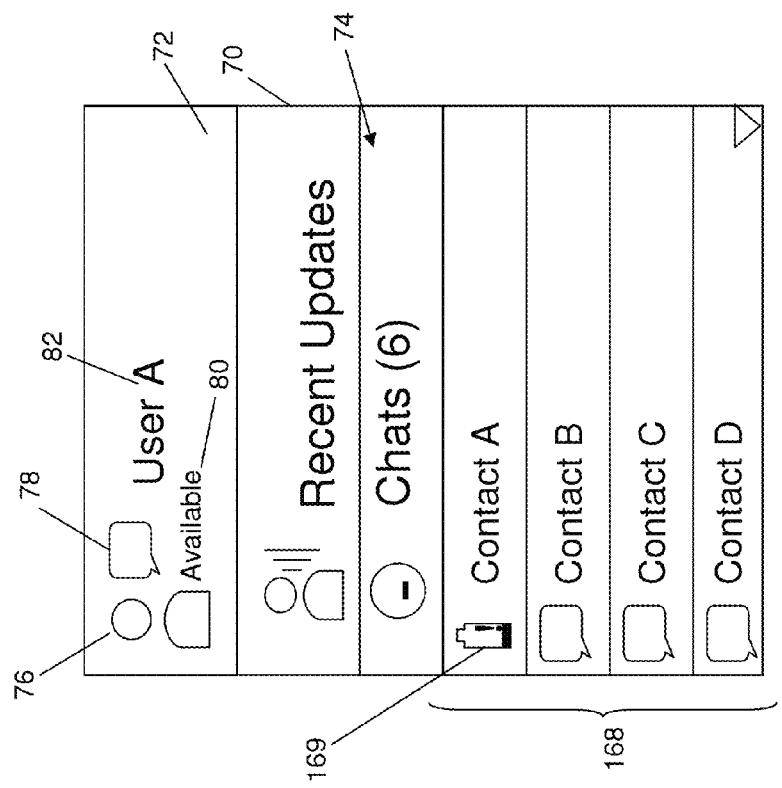
FIG. 27 is a screen shot of an example IM UI.

A low battery state associated with a contact can also be displayed in a list of chats 168 as shown in FIG. 27. In the example shown in FIG. 27, the chat listing 168 for Contact A indicates that mobile device 10 for Contact A is experiencing a low battery state by displaying a low battery presence status icon 169. In this way, the user can, at a glance, determine which of their contacts are in a low battery state, for example, when deciding with which contacts they wish to communicate.

Figure 28:
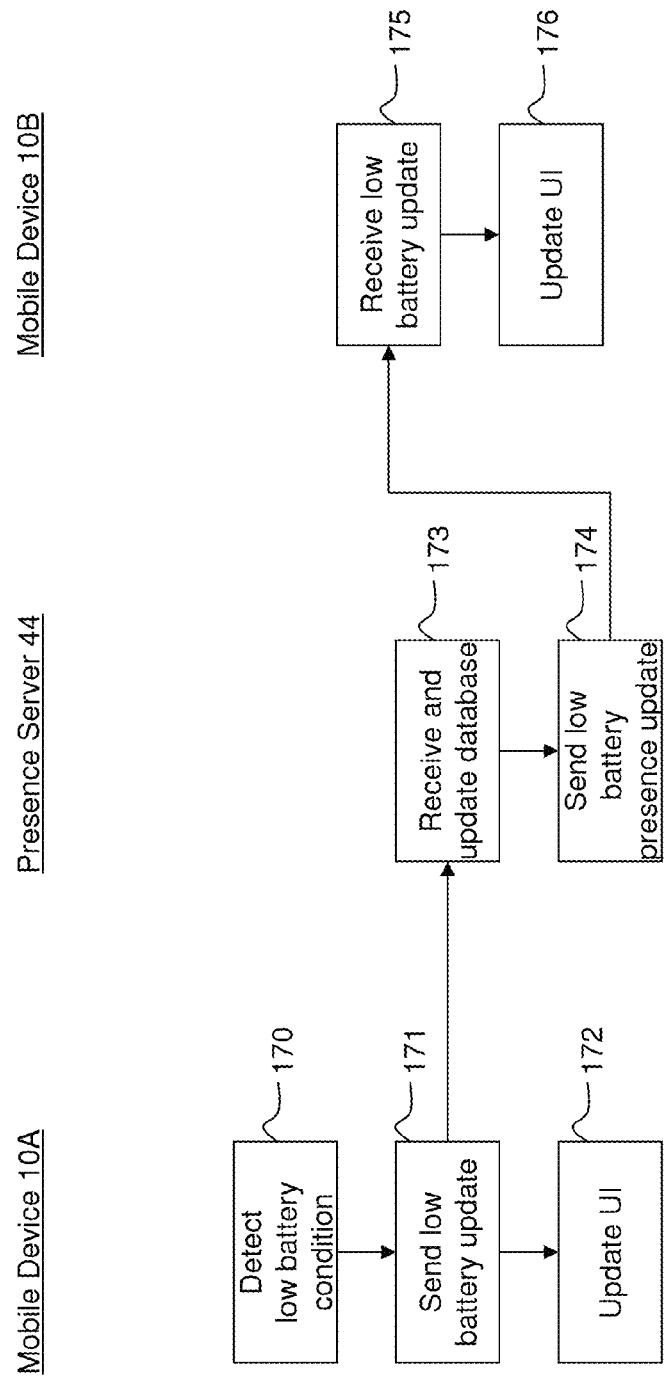
FIG. 28 is a flow chart providing an example set of computer executable operations for updating presence information based on battery status.
Figure 29:
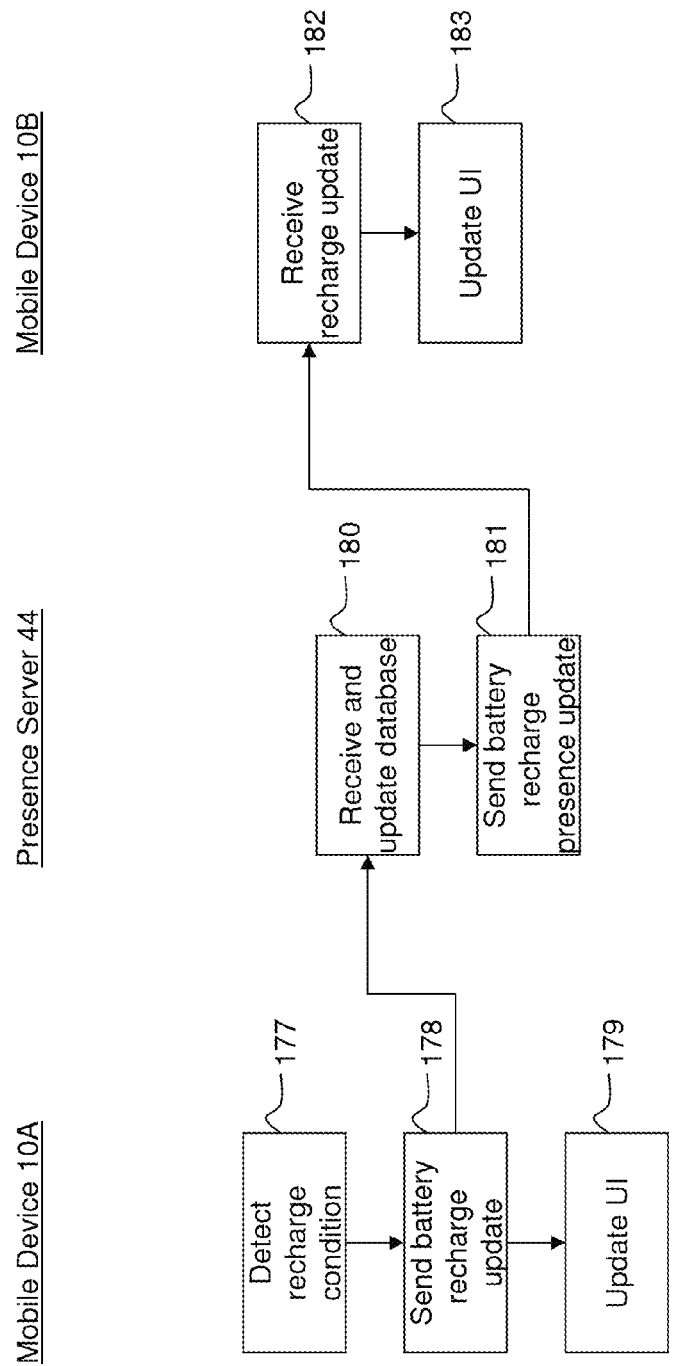
FIG. 29 is a flow chart providing an example set of computer executable operations for updating presence information based on battery status.

FIGS. 28 and 29 illustrate exemplary computer executable operations that may be performed in providing a low battery update 42 to a contact (FIG. 28), and subsequently providing a recharge update 48 to the same contact via the presence server 44 (FIG. 29). At 170, the presence update module 66 detects a low battery condition, e.g., by monitoring a battery level or being advised of same. The presence update module 66 then sends a low battery update 42 to the presence server 44, at 171, and updates or otherwise instructs the IM application 60 to update the appropriate local UI elements, at 172, e.g., by updating the presence icon 78 to be augmented with the battery icon 124. The presence server 44 receives the low battery update 42 at 173, and sends a battery update 42, at 174, to contacts associated with mobile device 10A. In this example, one of the contacts being updated is mobile device 10B, which receives the low battery update 42 at 175 and updates its UI, at 176, e.g., as shown in the screen shots described above.

In the example shown in FIG. 29 it is assumed that subsequently, the presence update module 66 detects a recharge condition, at 177, indicating that the battery level has been restored such that the battery meets or exceeds a predetermined threshold level. Upon detecting the recharge condition, at 177, the presence update module 66 sends a recharge update 48, at 178, to the presence server 44 and updates the appropriate UI components on mobile device 10A, at 179.

The presence server 44 receives the recharge update, at 180, and sends a recharge update 48, at 181, to contacts associated with mobile device 10A. The recharge update 48 is received by mobile device 10B, at 182, and its UI is updated, at 183, e.g., to remove the battery icon 126, change the presence status from battery presence status to another status, etc.

Figure 30:
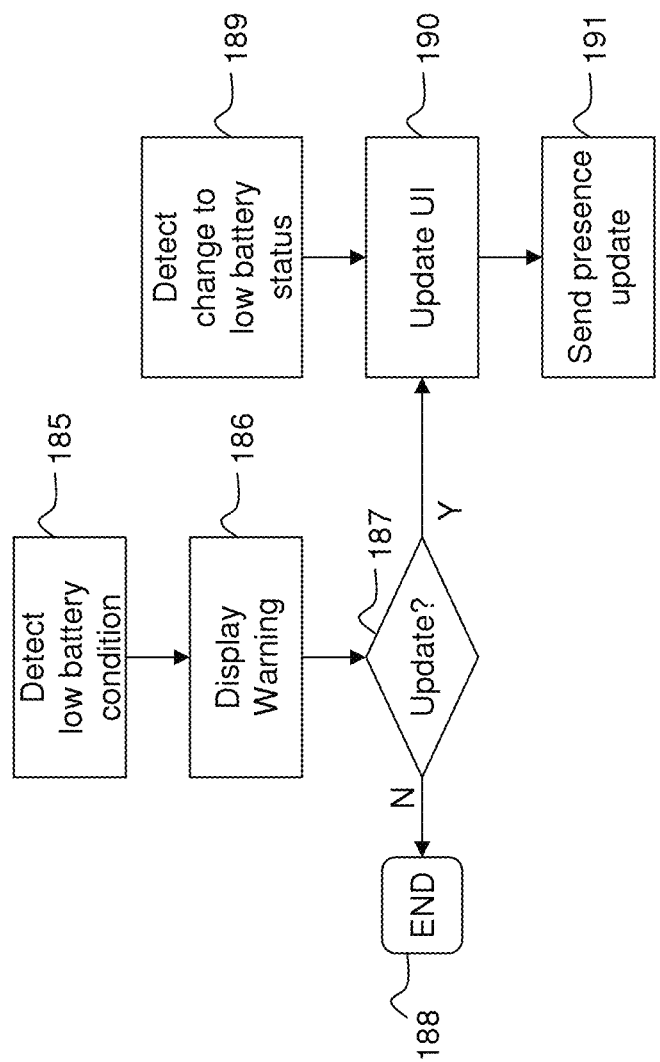
FIG. 30 is a flow chart providing an example set of computer executable operations for updating a UI based on battery status.

FIG. 30 illustrates an example set of computer executable operations that may be performed by the presence update module 66 when detecting a low battery condition or a request to change a current presence status to a low battery presence status. At 185, a low battery condition is detected by the presence update module 66. The presence update module 66, in this example, displays a low battery warning 156 such as that illustrated in FIG. 23, and determines whether or not the user has chosen to have their presence status updated, at 187. If not, the presence status is unaffected and the process ends at 188. If the user selects the YES button 160 in the example of FIG. 23, the IM UI 70 and other UI components such as conversation UIs 104 are updated, at 190, and a presence update, e.g., a low battery update 42 sent at 191. As also shown in FIG. 30, the presence update module 66 may also detect a change in IM presence to the low battery status, at 189, and update the UI, at 190, and send the low battery update 42, at 191, in response thereto. It can therefore be appreciated that the low battery presence status can be triggered, applied, and used in various ways. It can also be appreciated that the low battery update 42 can also be triggered in various ways.

Figure 31:
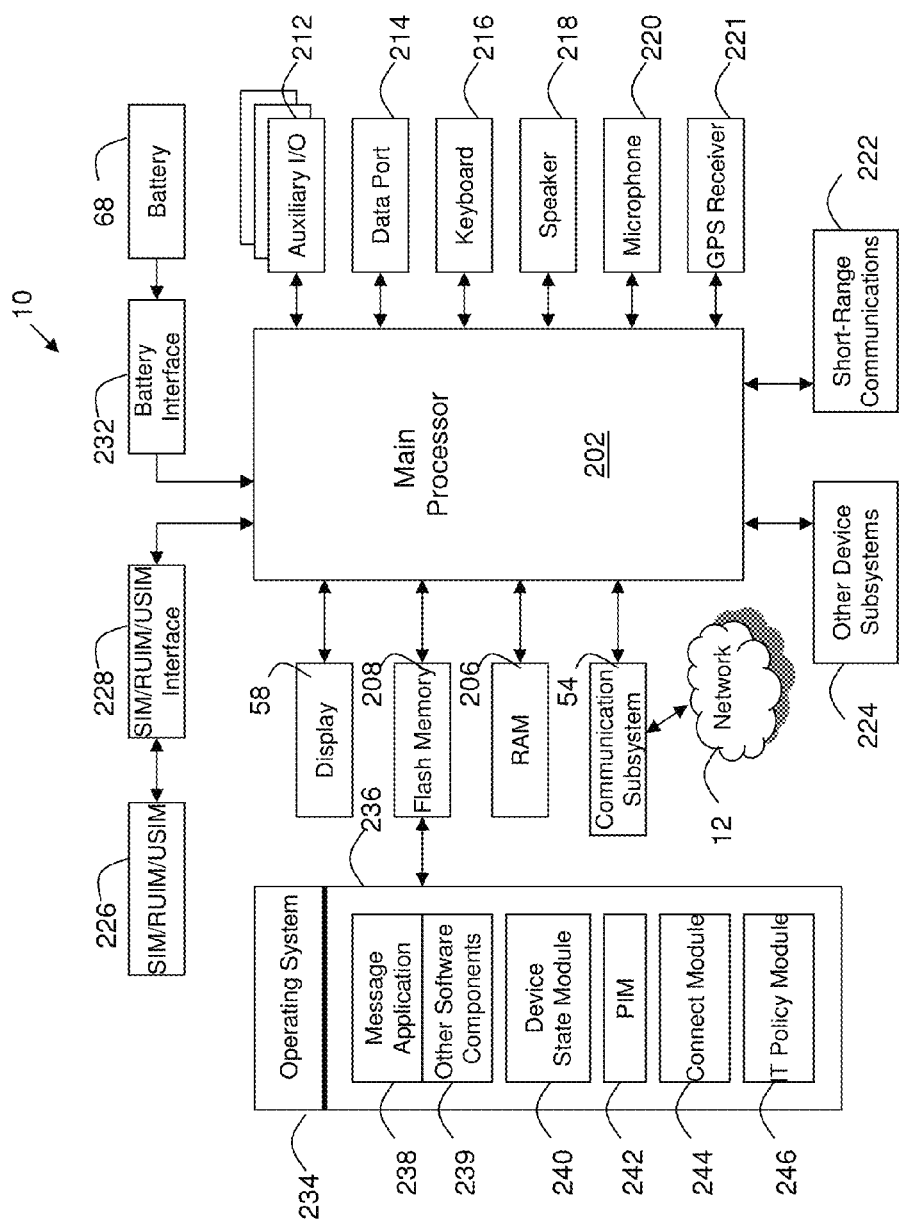
FIG. 31 is a block diagram of an example configuration for a mobile device.

Referring now to FIG. 31, shown therein is a block diagram of an example of a mobile device 10. The mobile device 10 comprises a number of components such as a main processor 202 that controls the overall operation of the mobile device 10. Communication functions, including data and voice communications, are performed through a communication subsystem 54. The communication subsystem 54 receives messages from and sends messages to a wireless network 12. In this example of the mobile device 10, the communication subsystem 54 is configured in accordance with the Global System for Mobile Communication (GSM) and General Packet Radio Services (GPRS) standards. The GSM/GPRS wireless network is used worldwide and it is expected that these standards will be superseded eventually by 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the examples described herein are intended to use any other suitable standards that are developed in the future. The wireless link connecting the communication subsystem 54 with the wireless network 12 represents one or more different Radio Frequency (RF) channels, operating according to defined protocols specified for GSM/GPRS communications. With newer network protocols, these channels are capable of supporting both circuit switched voice communications and packet switched data communications.

The main processor 202 also interacts with additional subsystems such as a Random Access Memory (RAM) 206, a flash memory 208, a display 58, an auxiliary input/output (I/O) subsystem 212, a data port 214, a keyboard 216, a speaker 218, a microphone 220, GPS receiver 221, short-range communications subsystem 222 and other device subsystems 224.

Some of the subsystems of the mobile device 10 perform communication-related functions, whereas other subsystems may provide "resident" or on-device functions. By way of example, the display 210 and the keyboard 216 may be used for both communication-related functions, such as entering a text message for transmission over the network 12, and device-resident functions such as a calculator or task list.

The mobile device 10 can send and receive communication signals over the wireless network 12 after required network registration or activation procedures have been completed. Network access is associated with a subscriber or user of the mobile device 10. To identify a subscriber, the mobile device 10 may use a subscriber module. Examples of such subscriber modules include a Subscriber Identity Module (SIM) developed for GSM networks, a Removable User Identity Module (RUIM) developed for CDMA networks and a Universal Subscriber Identity Module (USIM) developed for 3G networks such as UMTS. In the example shown, a SIM/RUIM/USIM 226 is to be inserted into a SIM/RUIM/USIM interface 228 in order to communicate with a network. The SIM/RUIM/USIM component 226 is one type of a conventional "smart card" that can be used to identify a subscriber of the mobile device 10 and to personalize the mobile device 10, among other things. Without the SIM/RUIM/USIM component 226, the mobile device 10 may not be fully operational for communication with the wireless network 12. By inserting the SIM/RUIM/USIM 226 into the SIM/RUIM/USIM interface 228, a subscriber can access all subscribed services. Services may include: web browsing and messaging such as e-mail, voice mail, SMS, and MMS. More advanced services may include: point of sale, field service and sales force automation. The SIM/RUIM/USIM 226 includes a processor and memory for storing information. Once the SIM/RUIM/USIM 226 is inserted into the SIM/RUIM/USIM interface 228, it is coupled to the main processor 202. In order to identify the subscriber, the SIM/RUIM/USIM 226 can include some user parameters such as an International Mobile Subscriber Identity (IMSI). An advantage of using the SIM/RUIM/USIM 226 is that a subscriber is not necessarily bound by any single physical mobile device. The SIM/RUIM/USIM 226 may store additional subscriber information for a mobile device as well, including datebook (or calendar) information and recent call information. Alternatively, user identification information can also be programmed into the flash memory 208.

The mobile device 10 is typically a battery-powered device and includes a battery interface 232 for receiving one or more batteries 68 (typically rechargeable). In at least some examples, the battery 68 can be a smart battery with an embedded microprocessor. The battery interface 232 is coupled to a regulator (not shown), which assists the battery 68 in providing power V+ to the mobile device 10. Although current technology makes use of a battery, future technologies such as micro fuel cells may provide the power to the mobile device 10.

The mobile device 10 also includes an operating system 234 and software components 236 to 246 which are described in more detail below. The operating system 234 and the software components 236 to 246 that are executed by the main processor 202 are typically stored in a persistent store such as the flash memory 208, which may alternatively be a read-only memory (ROM) or similar storage element (not shown). Those skilled in the art will appreciate that portions of the operating system 234 and the software components 236 to 246, such as specific device applications, or parts thereof, may be temporarily loaded into a volatile store such as the RAM 206. Other software components can also be included, as is well known to those skilled in the art.

The subset of software applications 236 that control basic device operations, including data and voice communication applications, may be installed on the mobile device 10 during its manufacture. Other software applications include a message application 238 that can be any suitable software program that allows a user of the mobile device 10 to send and receive electronic messages. Various alternatives exist for the message application 238 as is well known to those skilled in the art. Messages that have been sent or received by the user are typically stored in the flash memory 208 of the mobile device 10 or some other suitable storage element in the mobile device 10. In at least some examples, some of the sent and received messages may be stored remotely from the mobile device 10 such as in a data store of an associated host system that the mobile device 10 communicates with.

The software applications can further comprise a device state module 240, a Personal Information Manager (PIM) 242, and other suitable modules (not shown). The device state module 240 provides persistence, i.e. the device state module 240 ensures that important device data is stored in persistent memory, such as the flash memory 208, so that the data is not lost when the mobile device 10 is turned off or loses power.

The PIM 242 includes functionality for organizing and managing data items of interest to the user, such as, but not limited to, e-mail, contacts, calendar events, voice mails, appointments, and task items. A PIM application has the ability to send and receive data items via the wireless network 12. PIM data items may be seamlessly integrated, synchronized, and updated via the wireless network 12 with the mobile device subscriber's corresponding data items stored and/or associated with a host computer system. This functionality creates a mirrored host computer on the mobile device 10 with respect to such items. This can be particularly advantageous when the host computer system is the mobile device subscriber's office computer system.

The mobile device 10 may also comprise a connect module 244, and an IT policy module 246. The connect module 244 implements the communication protocols that are required for the mobile device 10 to communicate with the wireless infrastructure and any host system, such as an enterprise system, that the mobile device 10 is authorized to interface with.

The connect module 244 includes a set of APIs that can be integrated with the mobile device 10 to allow the mobile device 10 to use any number of services associated with the enterprise system. The connect module 244 allows the mobile device 10 to establish an end-to-end secure, authenticated communication pipe with a host system (not shown). A subset of applications for which access is provided by the connect module 244 can be used to pass IT policy commands from the host system to the mobile device 10. This can be done in a wireless or wired manner. These instructions can then be passed to the IT policy module 246 to modify the configuration of the device 10. Alternatively, in some cases, the IT policy update can also be done over a wired connection.

The IT policy module 246 receives IT policy data that encodes the IT policy. The IT policy module 246 then ensures that the IT policy data is authenticated by the mobile device 10. The IT policy data can then be stored in the flash memory 208 in its native form. After the IT policy data is stored, a global notification can be sent by the IT policy module 246 to all of the applications residing on the mobile device 10. Applications for which the IT policy may be applicable then respond by reading the IT policy data to look for IT policy rules that are applicable.

Other types of software applications or components 239 can also be installed on the mobile device 10. These software applications 239 can be pre-installed applications (i.e. other than message application 238) or third party applications, which are added after the manufacture of the mobile device 10. Examples of third party applications include games, calculators, utilities, etc.

The additional applications 239 can be loaded onto the mobile device 10 through at least one of the wireless network 12, the auxiliary I/O subsystem 212, the data port 214, the short-range communications subsystem 222, or any other suitable device subsystem 224. This flexibility in application installation increases the functionality of the mobile device 10 and may provide enhanced on-device functions, communication-related functions, or both. For example, secure communication applications may enable electronic commerce functions and other such financial transactions to be performed using the mobile device 10.

The data port 214 enables a subscriber to set preferences through an external device or software application and extends the capabilities of the mobile device 10 by providing for information or software downloads to the mobile device 10 other than through a wireless communication network. The alternate download path may, for example, be used to load an encryption key onto the mobile device 10 through a direct and thus reliable and trusted connection to provide secure device communication.

The data port 214 can be any suitable port that enables data communication between the mobile device 10 and another computing device. The data port 214 can be a serial or a parallel port. In some instances, the data port 214 can be a Universal Serial Bus (USB) port that includes data lines for data transfer and a supply line that can provide a charging current to charge the battery 68 of the mobile device 10.

The short-range communications subsystem 222 provides for communication between the mobile device 10 and different systems or devices, without the use of the wireless network 12. For example, the subsystem 222 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download may be processed by the communication subsystem 54 and input to the main processor 202. The main processor 202 may then process the received signal for output to the display 210 or alternatively to the auxiliary I/O subsystem 212. A subscriber may also compose data items, such as e-mail messages, for example, using the keyboard 216 in conjunction with the display 210 and possibly the auxiliary I/O subsystem 212. The auxiliary I/O subsystem 212 may comprise devices such as: a touch screen, mouse, track ball, track pad, optical navigation module, infrared fingerprint detector, or a roller wheel with dynamic button pressing capability. The keyboard 216 is an alphanumeric keyboard and/or telephone-type keypad. However, other types of keyboards may also be used, such as a virtual or "soft" keyboard rendered as images on a touch screen. A composed item may be transmitted over the wireless network 12 through the communication subsystem 54.

For voice communications, the overall operation of the mobile device 10 in this example is substantially similar, except that the received signals are output to the speaker 218, and signals for transmission are generated by the microphone 220. Alternative voice or audio I/O subsystems, such as a voice message recording subsystem, can also be implemented on the mobile device 10. Although voice or audio signal output is accomplished primarily through the speaker 218, the display 210 can also be used to provide additional information such as the identity of a calling party, duration of a voice call, or other voice call related information.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, any component of or related to the wireless infrastructure 14, etc., or accessible or connectable thereto. Any application or module herein described may be implemented using computer readable/executable instructions that may be stored or otherwise held by such computer readable media.

It will also be appreciated that the example embodiments and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above has been described with reference to certain specific embodiments, various modifications thereof will be apparent to those skilled in the art without departing from the scope of the claims appended hereto.

The invention claimed is:

1. A method of operating a mobile device during a conservation of an instant messaging service, the method comprising:

after detecting a low battery state of a battery on the mobile device, sending a low battery update to a presence server for the instant messaging service, to enable the low battery update to be provided to one or more contacts associated with the mobile device and to enable a first low battery presence icon to be displayed by respective devices for the one or more contacts; wherein the first low battery presence icon comprises a contact presence icon associated with the mobile device augmented with a low battery icon associated with the low battery state of the mobile device; and updating an instant messaging user interface at the mobile device with a second low battery presence icon to indicate that the low battery update has been sent to the presence server to update the low battery state of the mobile device to the one or more contacts, wherein the second low battery presence icon comprises the contact presence icon associated with the mobile device augmented with the low battery icon associated with the low battery state of the mobile device, wherein updating the instant messaging user interface at the mobile device comprises at least one of altering an existing presence icon of the mobile device to include the second low battery presence icon and replacing the existing presence icon with the second low battery presence icon.

2. The method according to claim 1, wherein the second low battery presence icon comprises a description associated with the contact presence icon of the mobile device.

3. The method according to claim 1, further comprising upon detecting that the battery for the mobile device has been connected to a power source, altering the second low battery presence icon to indicate that a recharge of the battery is in progress.

4. The method according to claim 1, further comprising providing a low battery warning is displayed at the mobile device comprised of a selection for sending the low battery update to the presence server, and wherein the low battery update is sent upon detecting the selection associated with the low battery warning at the mobile device.

5. The method according to claim 1, further comprising after detecting that the low battery state no longer exists, sending a recharge update to the presence server to enable the recharge update to be provided to the one or more contacts associated with the mobile device.

6. The method according to claim 5, further comprising updating the instant messaging user interface for the mobile device to indicate that the low battery state of the mobile device no longer exists.

7. The method according to claim 6, wherein updating the instant messaging user interface the mobile device comprises one of removing the low battery icon from the second low battery presence icon and replacing the second low battery presence icon with the existing presence icon.

8. The method according to claim 5, wherein the recharge update enables a battery recharge alert to be displayed to the one or more contacts associated with the mobile device.

9. A non-transitory computer readable medium comprising computer executable instructions for operating a mobile device during a conservation of an instant messaging service, the computer executable instructions comprising instructions for:
  after detecting a low battery state of a battery on the mobile device, sending a low battery update to a presence server for the instant messaging service, to enable the low battery update to be provided to one or more contacts associated with the mobile device and to enable a first low battery presence icon to be displayed by respective devices for the one or more contacts; wherein the first low battery presence icon comprises a contact presence icon associated with the mobile device augmented with a low battery icon associated with the low battery state of the mobile device; and
  updating an instant messaging user interface at the mobile device with a second low battery presence icon to indicate that the low battery update has been sent to the presence server to update the low battery state of the mobile device to the one or more contacts, wherein the second low battery presence icon comprises the contact presence icon associated with the mobile device augmented with the low battery icon associated with the low battery state of the mobile device, wherein updating the instant messaging user interface at the mobile device comprises at least one of altering an existing presence icon of the mobile device to include the second low battery presence icon and replacing the existing presence icon with the second low battery presence icon.

10. The non-transitory computer readable medium according to claim 9, wherein the second low battery presence icon comprises a description associated with the contact presence icon of the mobile device.

11. The non-transitory computer readable medium according to claim 9, further comprising instructions for: upon detecting that the battery for the mobile device has been connected to a power source, altering the second low battery presence icon to indicate that a recharge of the battery is in progress.

12. The non-transitory computer readable medium according to claim 9, further comprising instructions for providing a low battery warning is displayed at the mobile device comprised of a selection for sending the low battery update to the presence server, and wherein the low battery update is sent upon detecting a selection associated with the low battery warning at the mobile device.

13. The non-transitory computer readable medium according to claim 9, further comprising instructions for: after detecting that the low battery state no longer exists, sending a recharge update to the presence server to enable the recharge update to be provided to the one or more contacts associated with the mobile device.

14. The non-transitory computer readable medium according to claim 13, further comprising instructions for updating the instant messaging user interface for the mobile device to indicate that the low battery state of the mobile device no longer exists.

15. The non-transitory computer readable medium according to claim 14, wherein updating the instant messaging user interface the mobile device comprises one of removing the second low battery presence icon from the second low battery presence icon and replacing the second low battery presence icon with the existing presence icon.

16. The non-transitory computer readable medium according to claim 13, wherein the recharge update enables a battery recharge alert to be displayed to the one or more contacts associated with the mobile device.

17. A mobile device comprising a processor, a display, and memory, the memory comprising computer executable instructions for operating the mobile device during a conservation of an instant messaging service, the computer executable instructions comprising instructions for:
  after detecting a low battery state of a battery on the mobile device, sending a low battery update to a presence server for the instant messaging service, to enable the low battery update to be provided to one or more contacts associated with the mobile device and to enable a first low battery presence icon to be displayed by respective devices for the one or more contacts; wherein the first low battery presence icon comprises a contact presence icon associated with the mobile device augmented with a low battery icon associated with the low battery state of the mobile device; and
  updating an instant messaging user interface at the mobile device with a second low battery presence icon to indicate that the low battery update has been sent to the presence server to update the low battery state of the mobile device to the one or more contacts, wherein the second low battery presence icon comprises the contact presence icon associated with the mobile device augmented with the low battery icon associated with the low battery state of the mobile device, wherein updating the instant messaging user interface at the mobile device comprises at least one of altering an existing presence icon of the mobile device to include the second low battery presence icon and replacing the existing presence icon with the second low battery presence icon.

\* \* \* \* \*